(12) United States Patent
Dumitriu et al.

(10) Patent No.: US 8,037,186 B2
(45) Date of Patent: *Oct. 11, 2011

(54) SYSTEM AND METHOD FOR ROUTING SERVICE REQUESTS

(75) Inventors: Dan Mihai Dumitriu, Seattle, WA (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/399,881

(22) Filed: Mar. 6, 2009

(65) Prior Publication Data

US 2009/0172191 A1 Jul. 2, 2009

Related U.S. Application Data

(63) Continuation of application No. 11/375,652, filed on Mar. 14, 2006, now Pat. No. 7,519,734.

(51) Int. Cl.
*G06F 15/16* (2006.01)
*G06F 12/00* (2006.01)

(52) U.S. Cl. ........................................ 709/226; 718/105
(58) Field of Classification Search .......... 709/223–229, 709/250, 232; 719/105
See application file for complete search history.

(56) References Cited

U.S. PATENT DOCUMENTS

| | | | |
|---|---|---|---|
| 5,325,464 A | 6/1994 | Pechanek et al. | |
| 5,742,762 A | 4/1998 | Scholl et al. | |
| 5,944,782 A | 8/1999 | Noble et al. | |
| 6,061,722 A | 5/2000 | Lipa et al. | |
| 6,134,244 A | 10/2000 | Van Renesse | |
| 6,185,619 B1 * | 2/2001 | Joffe et al. | 709/229 |
| 6,370,580 B2 | 4/2002 | Kriegsman | |
| 6,411,967 B1 | 6/2002 | Van Renesse | |
| 6,484,204 B1 | 11/2002 | Rabinovich | |
| 6,505,254 B1 | 1/2003 | Johnson et al. | |
| 6,529,953 B1 | 3/2003 | Van Renesse | |
| 6,560,717 B1 * | 5/2003 | Scott et al. | 714/4 |
| 6,629,149 B1 | 9/2003 | Fraser et al. | |
| 6,915,329 B2 | 9/2003 | Kriegsman | |
| 6,724,770 B1 | 4/2004 | Van Renesse | |
| 6,760,775 B1 | 7/2004 | Anerousis et al. | |
| 7,047,315 B1 | 5/2006 | Srivastava | |
| 7,062,556 B1 * | 6/2006 | Chen et al. | 709/226 |
| 7,240,100 B1 | 7/2007 | Wein et al. | |
| 7,519,734 B1 * | 4/2009 | Dumitriu et al. | 709/238 |
| 2003/0187931 A1 | 10/2003 | Olsen et al. | |
| 2003/0200277 A1 | 10/2003 | Kim | |

(Continued)

OTHER PUBLICATIONS

Abley, J., Hierarchical Anycast for Global Service Distribution, ISC, Inc. <http://www.isc.org/pubs/tn/?tn=isc-tn-2003-1.html> [retrieved Jul. 10, 2007], copyright 2003, pp. 7.

(Continued)

*Primary Examiner* — Zarni Maung
(74) *Attorney, Agent, or Firm* — Knobbe Martens Olson & Bear LLP

(57) ABSTRACT

A computer-implemented method routes service requests to services in a service framework provided by a plurality of hosts. The method comprises receiving a service request for a service in the service framework and discovering a plurality of candidate hosts that host the service. The plurality of candidate hosts are a subset of the plurality of hosts. The method further comprises selecting a candidate host from the plurality of candidate hosts based on measured latencies for the plurality of candidate hosts and routing the service request to the selected candidate host.

20 Claims, 16 Drawing Sheets

U.S. PATENT DOCUMENTS

| | | | |
|---|---|---|---|
| 2006/0069780 | A1 | 3/2006 | Batni et al. |
| 2006/0212873 | A1 | 9/2006 | Takahisa |
| 2007/0143460 | A1* | 6/2007 | Ben-David et al. ........... 709/223 |
| 2008/0025230 | A1 | 1/2008 | Patel et al. |
| 2008/0049616 | A1 | 2/2008 | Kamath et al. |

OTHER PUBLICATIONS

Adler, M., et al., Parallel Randomized Load Balancing (Preliminary Version), Proceedings of the 27th Annual ACM Symposium on Theory of Computing, May 29-Jun. 1, 1995, pp. 238-247, Las Vegas, Nevada, U.S.

Andersen, D., et al., Resilient Overlay Networks, Proceedings of the 18th ACM Symposium on Operating Systems Principles, Oct. 21-24, 2001, pp. 131-145, Banff, Canada.

Azar, Y., et al, Balanced Allocations, SIAM Journal on Computing, Feb. 2000, vol. 29, Issue 1, pp. 180-200.

Baryshnikov, Y., et al., Predictability of Web-Server Traffic Congestion, Proceedings of the 10th IEEE International Workshop on Web Content Caching and Distribution, Sep. 12-13, 200, Sophia Antipolis, France.

Castro, M., et al., Scalable Application-Level Anycast for Highly Dynamic Groups, Proceedings of the 5th COST264 International Workshop on Networked Group Communications, Sep. 16-19, 200, pp. 47-57, Munich, Germany.

Castro., M., et al., One ring to Rule Them All: Service Discovery and Binding in Structured Peer-to-Peer Overlay Networks, Proceedings of the 10th ACM SIGOPS European Workshop, Sep. 22-25, 200, pp. 140-145, Saint-Emilion, France.

Dahlin, M., Interpreting Stale Load Information, Proceedings of the 19th IEEE International Conference on Distributed Computing Systems, May 31-Jun. 4, 1999, pp. 285-296, Austin, Texas.

Dilley, J., et al., Globally Distributed Content Delivery, IEEE Internet Computing, Sep.-Oct. 2002, vol. 6, Issue 5, pp. 50-58.

Eager, D.L., et al., Adaptive Load Sharing in Homogeneous Distributed Systems, IEEE Transactions on Software Engineering, May 1986, vol. 12, Issue 5, pp. 662-675.

Engel, R., et al., Using IP Anycast for Load Distribution and Server Location, Proceedings of the Third IEEE Global Internet Mini-Conference at the Global Telecommunications Conference, Nov. 8-12, 1998, pp. 9, Sydney, Australia.

Engelschall, R.S., Load Balancing Your Web Site: Practical Approaches for Distributing HTTP Traffic, New Architect <http://www.webtechniques.com/archives/1998/05/engelschall/> [retrieved Jul. 10, 2007], May 1998, pp. 8.

Hardie, T. (ed.), Distributing Authoritative Name Servers Via Shared Unicast Addresses, Internet Informational RFC 3258 <http://www.ietf.org/rfc/rfc3258.txt> [retrieved Jul. 10, 2007], Apr. 2002, pp. 11.

Jung, J., et al., Flash Crowds and Denial of Service Attacks: Characterization and Implications for CDNS and Web Sites, Proceedings of the 11th International Conference on World Wide Web, May 7-11, 2002, pp. 293-304, Honolulu, Hawaii, U.S.

Karbhari, P., et al., ACDN: A Content Delivery Network for Applications, Proceedings of the ACM SIGMOD [Special Interest Group on the Management of Date] International Conference on Management of Data, Jun. 4-6, 2002, pp. 619, Madison, Wisconsin, U.S.

Kristoff, J.T., Anycast Addressing on the Internet, Kuro5hin.org, <http://aharp.ittns.northwestern.edu/papers/k5-anycast/index.html> [retrieved Jul. 10, 2007], Jan. 2, 2004, pp. 7 pages.

Mirchandaney, R., et al., Adaptive Load Sharing in Heterogeneous Distributed Systems, Journal of Parallel and Distributed Computing, Aug. 1990, vol. 9, Issue 4, pp. 331-346.

Mitzenmacheer, M.D., The Power of Two Choices in Randomized Load Balancing, University of California, Doctoral Dissertation, 1996, pp. 1-116, Berkeley, California, U.S.

Othman, O., and D.C. Schmidt, Optimizing Distributed System Performance Via Adaptive Middleware Load Balancing, Proceedings of the ACM SIGPLAN Workshop on Optimization of Middleware and Distributed Systems, Jun. 28, 2001, pp. 9, Snowbird, Utah, U.S.

Rowstron, A., and P. Druschel, Pastry: Scalable, Decentralized Object Location, and Routing for Large-Scale Peer-to-Peer Systems, Proceedings of IFIP/ACM International Conference on Distributed Systems Platforms (Middleware 2001), Nov. 12-16, 2001, pp. 329-350, Heidelberg, Germany.

Redundancy and Load Balancing With Anycast, Ruud.org, <http://bgphints.ruud.org/articles/anycast.html> [retrieved Jul. 10, 2007], Sep. 17, 2003, pp. 2.

Sivasubramanian, S., et al., Replication for Web Hosting Systems, ACM Computing Surveys, Sep. 2004, vol. 36, Issue 3, pp. 291-334.

Stoica, I., et al., Chord: A Scalable Peer-to-Peer Lookup Service for Internet Applications, Proceedings of the ACM SIGCOMM Conference, Aug. 2001, pp. 149-160, San Diego, California, U.S.

Van Renesse, R., et al., A Gossip-Style Failure Detection System, Proceedings of IFIP (Middleware 1998), Sep. 15-18, 199, pp. 1-16, The Lake District, United Kingdom.

Van Renesse, R., et al., Astrolabe: A robust and Scalable Technology for Distributed System Monitoring, Management, and Data Mining, ACM Transactions on Computer Systems, May 2003, vol. 21, Issue 2, pp. 164-206.

Van Steen, M., et al., Globe: A Wide-Area Distributed System, IEEE Concurrency, Jan.-Mar. 1999, vol. 7, Issue 1, pp. 70-78.

Wollman, W.V., et al., Plug and Play Server Load Balancing and Global Server Load Balancing for Tactical Networks, The MITRE Corporation, 2003, pp. 1-5, Eatontown, New Jersey, U.S.

Zhang, R., and Y.C. Hu, Anycast in Locality-Aware Peer-to-Peer Overlay Networks, Proceedings of International Workshop on Networked Group Communications and International Workshop on Internet QoS and Charging Technologies, Sep. 16-19, 200, pp. 34-46, Munich, Germany.

Zhao, B., et al., Tapestry: A Resilient Global-Scale Overlay for Service Deployment, IEEE Journal on Selected Areas in Communications, Jan. 2004, vol. 22, Issue 1, pp. 1-15.

Zhou, S., et al., Utopia: A Load Sharing Facility for Large, Heterogeneous Distributed Computer Systems, Software: practice and Experience, Dec. 1993, vol. 23, Issue 12, pp. 1305-1336.

* cited by examiner

SYSTEM AND METHOD FOR ROUTING SERVICE REQUESTS

CROSS-REFERENCE TO RELATED APPLICATION

This application is a continuation of U.S. patent application Ser. No. 11/375,652, entitled "System and Method for Routing Service Requests," filed Mar. 14, 2006, the entirety of which is incorporated herein by reference.

BACKGROUND

Enterprise computing environments are often implemented in decentralized environments, both in terms of software structure and administrative organization, which use large numbers of low-cost server resources to meet processing requirements. For example, thousands of servers or more may operate across multiple data centers. The servers may host services (e.g., business logic applications) that are accessed by processes. To access a given service, a process may transmit a service request to the service and the service may generate a response which includes the requested information. To generate the response, the service may in turn transmit other service requests to other services and underlying data stores. There may be thousands of such services or more and each service may have multiple clients (e.g., other services) spread across the computing infrastructure. Often, services are replicated across multiple hosts in different data centers to improve their scaleability and availability. For example, a given service may be hosted in several different data centers in different geographic locations in order to avoid a single point of failure.

To manage such systems, it is desirable for a computing infrastructure to enable clients to discover services in a seamless way, route service requests to hosts in a reliable manner, and/or permit services to add capacity easily and transparently. Providing request routing systems that meet such goals has proven challenging, particularly in systems that may experience host failures and network partitions. However, meeting such goals may permit the business objectives of the computing infrastructure to be achieved more effectively and efficiently.

Accordingly, an ongoing need exists for improved systems and methods that may be used to route service requests. It should be noted that, while certain advantages and features are described, the teachings herein may be used to implement systems and methods that do not have any of the advantages and features, but rather which have other advantages and features.

SUMMARY

According to an exemplary embodiment, a computer-implemented method routes service requests to services in a service framework provided by a plurality of hosts. The method comprises receiving a service request for a service in the service framework and discovering a plurality of candidate hosts that host the service. The plurality of candidate hosts are a subset of the plurality of hosts. The method further comprises selecting a candidate host from the plurality of candidate hosts based on measured latencies for the plurality of candidate hosts and routing the service request to the selected candidate host.

According to an exemplary embodiment, a computer-implemented method routes service requests to services in a service framework. The method comprises storing a model of at least a portion of a hierarchically-organized computing environment that implements the service framework. The computing environment comprises a plurality of hosts. The model is organized in a hierarchy comprising (i) a first level including a plurality of leaf nodes, each of the leaf nodes corresponding to one of the plurality of hosts, and (ii) a second level including a first plurality of zones which each comprise a subset of the plurality of leaf nodes. The method further comprises dispatching service requests to different ones of the levels of the hierarchy based on measured latencies of the plurality of hosts.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF EXEMPLARY EMBODIMENTS

I. Exemplary Architecture

A. Physical Topology

Figure 1:
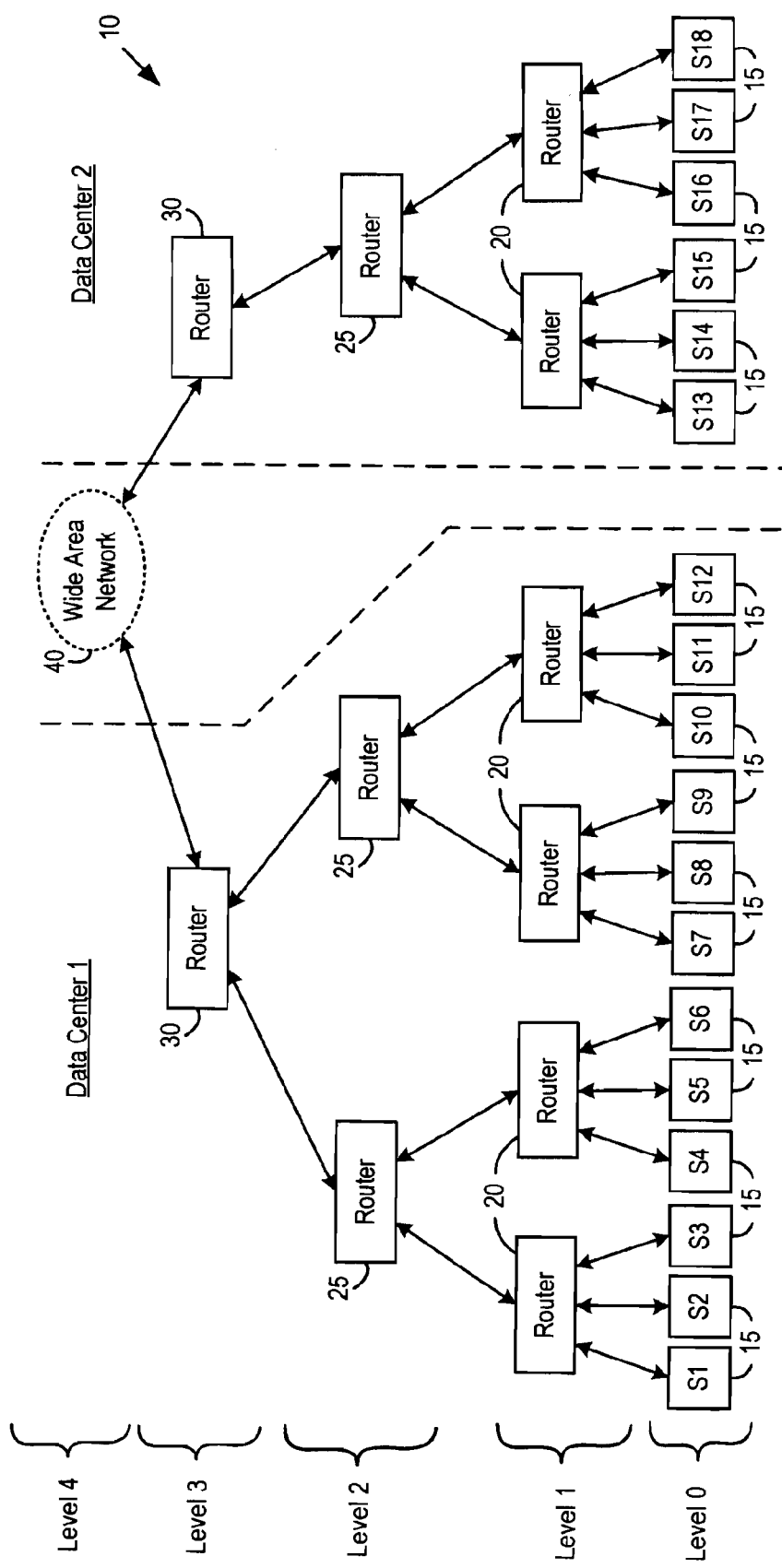
FIG. 1 is a hardware view of a system that employs a request routing system according to an exemplary embodiment.
Figure 2:
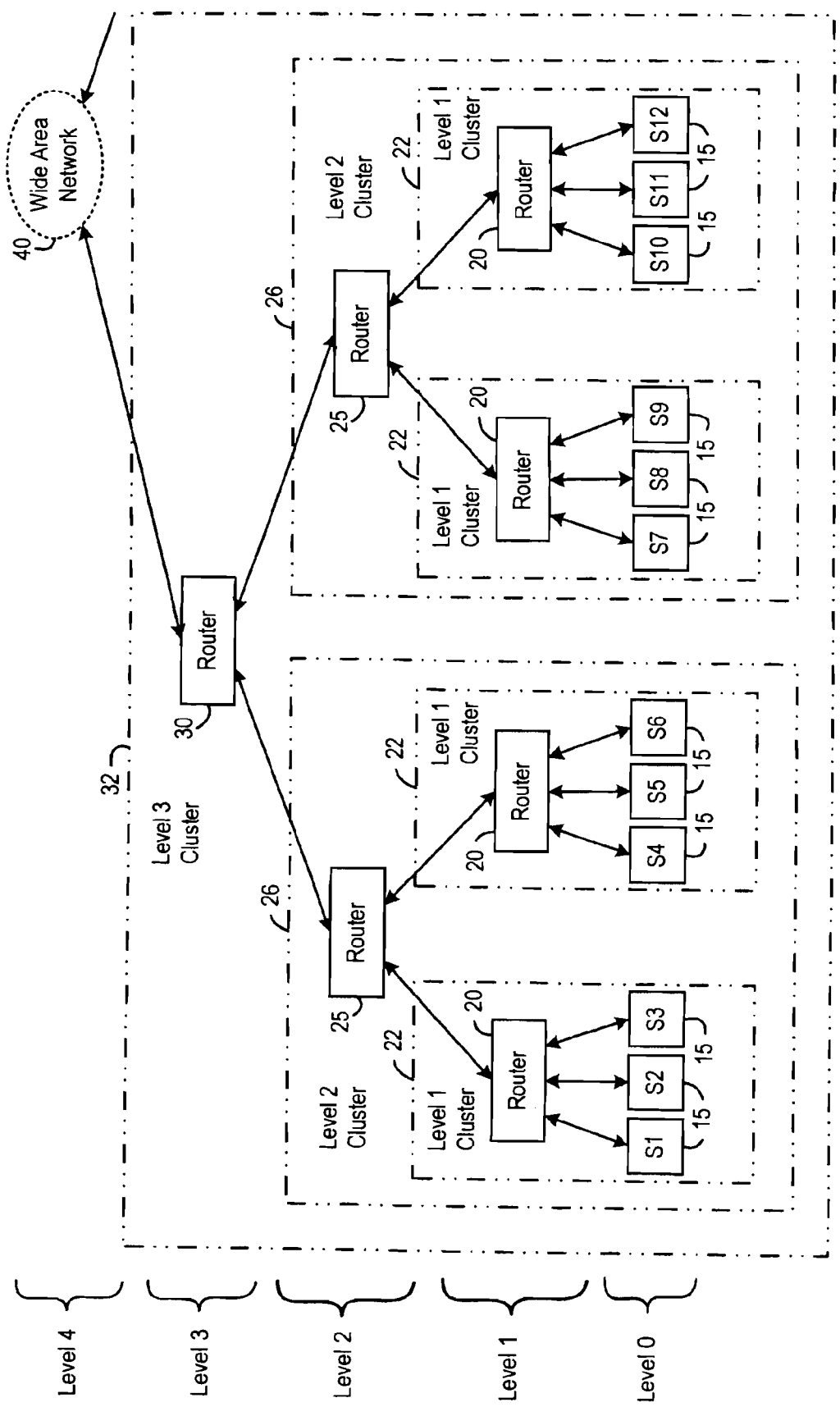
FIG. 2 is a block diagram showing a portion of the system of FIG. 1 in greater detail.

Referring now to FIGS. 1-2, a hardware system 10 that incorporates a request routing system 55 according to an exemplary embodiment is shown. FIG. 1 shows a physical topology of the hardware system 10. The system 10 comprises a plurality of hosts (e.g., servers) 15, a plurality of routers (e.g., switches) 20, 25 and 30, and a wide area network or other communication network 40. In the example of FIG. 1, the routers 30 are respectively located in different data centers, and the wide area network 40 connects hardware located in the two data centers. Although a limited number of hosts 15 and routers 20, 25 and 30 are shown, it will be appreciated that the system 10 may, for example, comprise large numbers of servers (e.g., hundreds, thousands, millions, or more) operating across multiple data centers and hosting large numbers of services (e.g., hundreds, thousands, millions, or more). Each host 15 may include one or more client processes that may send service requests to one or more services 118 (see FIG. 5) executing on other hosts 15. Thus, any given host 15 may operate as a client host in some situations and as a server host in other situations. Herein, the term "client" is used to refer to internal processes hosted on the hosts 15 and not to external processes hosted on external computing systems, such as end user browsers in the case of a website application.

Each service 118 may be replicated across multiple hosts 15 to improve scaleability and availability. Further, each service 118 may be hosted in multiple data centers to avoid single point of failures (e.g., due to failure of a router 20). When a client needs to make a service request, it may use a virtual IP address or other type of identifier for the service 118, and the request may subsequently be routed to the service 118 as described in greater detail below.

By way of example, the system 10 may be used to host a website and/or to provide information to third parties that the third parties may use in hosting a website. For example, the system 10 may be used to host an interactive commerce website, a search engine website, content website, and/or other type of website. Various ones of the hosts 15 may be executing processes that are used to construct web pages and to publish the web pages to visitors of the website. Each web page may in turn be composed of results from multiple services 18. Examples of services may include a product detail service, an ordering service, a shopping cart service, and so on.

As shown in FIG. 1, the system 10 may be organized as a multi-level hierarchy comprising a plurality of levels, such as levels 0-4. Level 0 comprises the hosts 15, which are individually labeled S1-S18. Level 1 comprises routers 20 that connect respective groups of the hosts 15. Level 2 comprises routers 25 that connect respective ones of the routers 20. Level 3 comprises routers 30 that connect respective ones of the routers 25. Level 4 comprises a wide area network 40 that connects the routers 30. At each level, different types of links may be used, such as high speed optical links, wide area networks, and so on, each with varying bandwidth and latency properties.

With reference to FIG. 2, FIG. 2 shows a manner in which the hardware in Data Center 1 may be organized into a plurality of clusters 22, 26, and 32. At level 1, each cluster 22 comprises one of the routers 20 and an associated group of the hosts 15. At levels 2 and 3, each cluster 26, 32 comprises one of the routers 25, 30 which connects lower level clusters. The clusters 32 at level 3 correspond to a data center and multiple clusters 32 at level 3 may be connected through the wide area network 40. By way of example, if it is assumed that a level 3 cluster corresponds physically to a data center, as described, then a level 2 cluster may correspond to an area within the data center, and a level 1 cluster may correspond to a rack of hosts 15 within the data center. Data Center 2 is not shown, however, it will be appreciated that the hardware in Data Center 2 may be grouped in a similar manner as shown for the hardware of Data Center 1. Likewise, other data centers may be connected to wide area network 40.

Given the physical topology as described above, the system 10 may have the following latency properties. First, the latency between hosts 15 in the same cluster may be lower than that of hosts 15 in different clusters. For example, within the same cluster 22 in level 1, the latency between hosts 15 may be very low as compared to the latency between hosts 15 in different clusters 22. Second, the latency may increase at higher levels in the hierarchy. For example, latency between hosts 15 in different clusters 26 at level 2 is less than that of hosts 15 in different clusters 32 at level 3. As will be appreciated, the latency between two hosts 15 may be from microseconds or less to hundreds of milliseconds or more depending on whether the hosts 15 are in the same cluster (and at what level), whether they are in the same data center, the type of network connection(s) which connect the two hosts 15 (including the bandwidths and latencies of the network connection(s)), and so on.

B. Logical Model of Physical Topology

Figure 3:
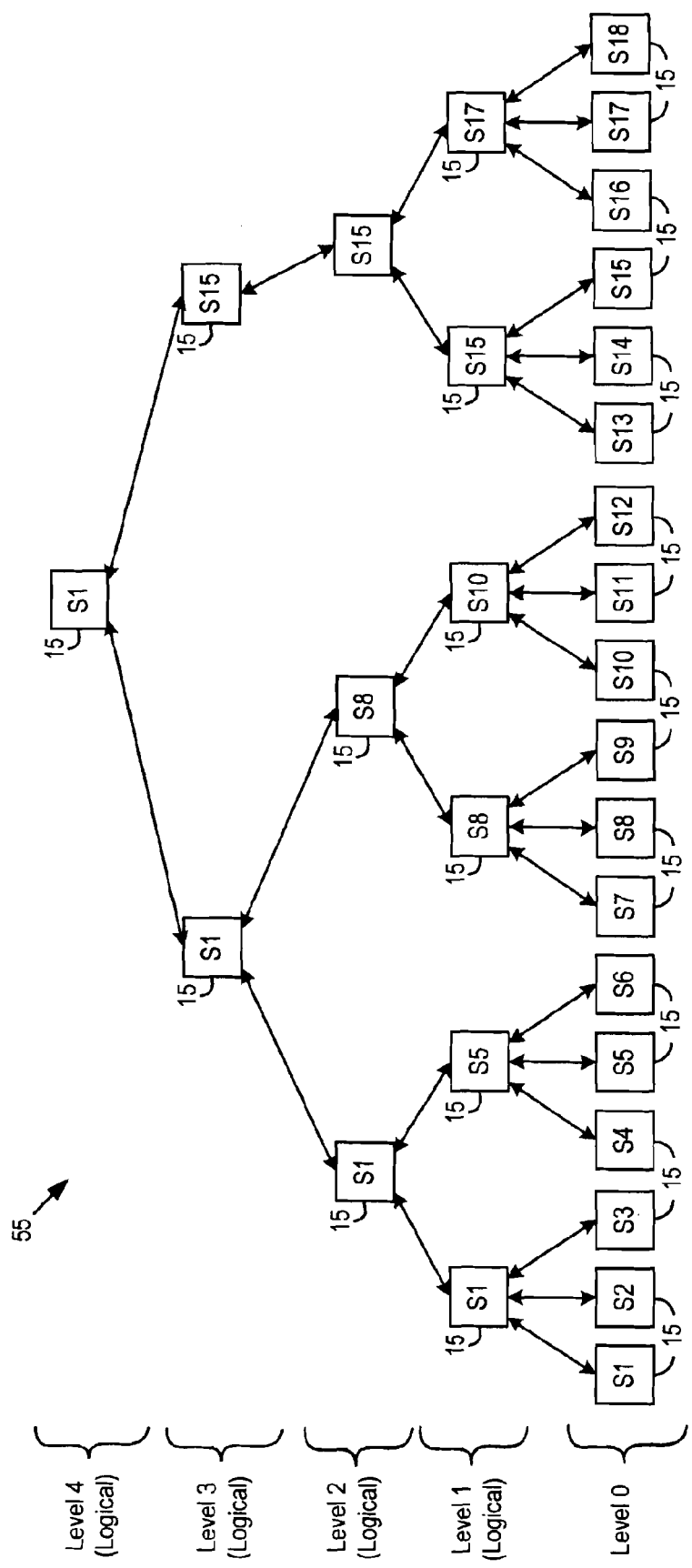
FIG. 3 is a block diagram of a logical model of the system of FIG. 1 implemented by a request routing system according to an exemplary embodiment.
Figure 4:
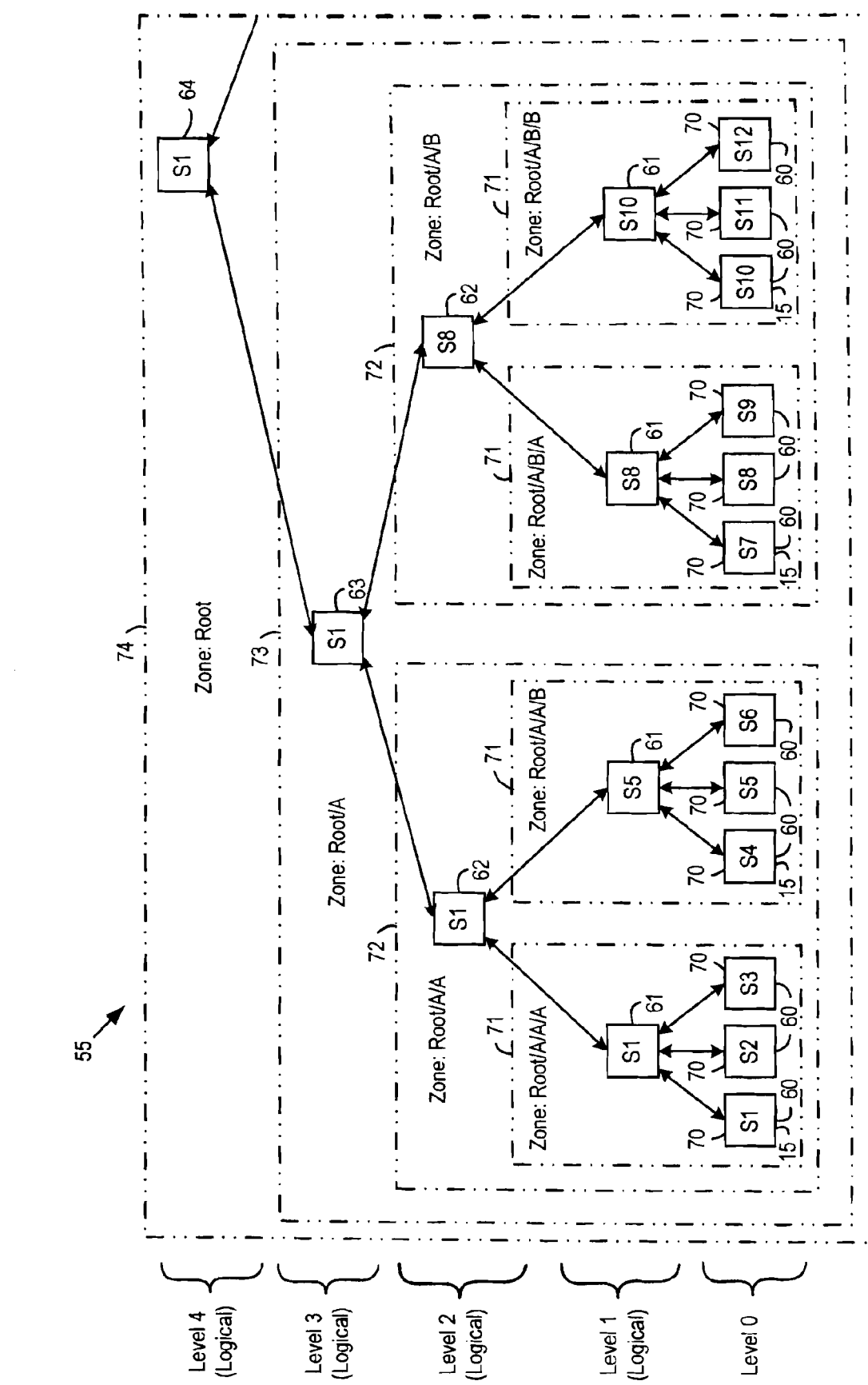
FIG. 4 is a block diagram showing a portion of the logical model of FIG. 3 in greater detail.

Referring now to FIGS. 3-4, a logical model of the system 10 that is used by request routing system 55 is shown. The logical model depicted in FIGS. 3-4 is used by one or more communicators 114, 116 (see FIG. 5) that communicate information within the system 10 regarding contact information, availability, and so on, of services 118 in the system 10. As shown in FIG. 3, the hosts 15 may be organized in a logical hierarchy (tree structure). FIG. 3 shows the tree structure for both of the data centers shown in FIG. 1. FIG. 4 shows the tree structure for the data center shown in FIG. 2. As shown in FIG. 4, the tree structure may comprise a plurality of nodes 60-64 and a plurality of zones 70-74. The zones 70-74 are logical groupings of the nodes 60-64. The nodes 60-64 each serve as representatives for a respective one of the zones 70-74.

In an exemplary embodiment, the logical hierarchy in FIGS. 3-4 is configured to match the physical topology of the system 10. In this embodiment, the nodes 60 which are at the bottom of the tree structure represent the physical hosts 15 in FIGS. 1-2. The nodes 60 at the bottom of the tree structure are sometimes referred to herein as "leaf nodes." As shown in FIG. 1, a cluster 22 at level 1 is formed by a subset of the hosts 15. Likewise, zones 71, 72 and 73 represent the clusters at levels 1, 2 and 3, respectively. Zone 74, sometimes referred to herein as the "root zone," is a top-level zone and represents the entire set of clusters and underlying hosts 15 in FIGS. 1-2. Zones 70, sometimes referred to herein as the "leaf zones," correspond to individual hosts 15.

The nodes 60-64 each serve as representatives for a respective one of the zones 70-74. Thus, for example, host S1 is the representative node 61 for the zone Root/A/A/A at level 1, the representative node 62 for the zone Root/A/A at level 2, the representative node 63 for the zone Root/A at level 3, and the representative node 64 for the root zone. The representative for each leaf zone is the corresponding host 15 itself. (Although not specifically shown, it will be appreciated that leaf zones 70 may also be designated in accordance with the above path-naming convention, e.g., Root/A/A/A/A corresponding to host S1 at level 0). As will be described in greater detail below, the representative nodes 61-64 sometimes serve as intermediate proxies for routing service requests between the zones 70-74. In this situation, the hosts 15 serving as the representative node are sometimes referred to herein as "proxy hosts." It may also be noted that the hosts 15 serving as representatives (which gossip information) need not necessarily the same as the hosts 15 serving as proxy servers (which route requests), because the two sets of hosts can be aggregated using different aggregation functions.

It may be noted that there is only one physical host (e.g., host S1), but it is represented at multiple levels in the tree structure. In practice, this may be implemented by having separate logical processes executing on the host S1 for each separate zone 70-74 for which it is a representative node 60-64 (e.g., five separate logical processes for the arrangement shown in FIG. 1). By designating a representative node at each level, it is not necessary for all nodes 60-64 to be gossiping with all of the other nodes 60-64 (e.g., to communicate status information as described below). Rather, the representative node may be responsible for gossiping with the sibling zones for a particular node 60-64.

In the illustrated embodiment, there is one node 60-64 that serves as representative for each zone 70-74. More generally, multiple hosts 15 may be designated as representative nodes for a given zone. For example, it may be desirable to designate two representative nodes, e.g., a primary representative and a secondary representative, such that the secondary representative may serve as a backup in the event of a failure of the primary representative. The representative set of nodes for a zone may comprise a subset of the nodes from lower-level child zones. To provide for robustness against network partitions and correlated failures, when designating representatives for zones, it may be desirable to choose hosts from different child zones, rather than too many from any single child zone. This approach may be used for both nodes 60-64 and intermediate proxy hosts 15.

The groupings of nodes and zones may be determined by the groupings of hosts and routers in FIG. 1, as shown. For example, the zone at level 4 may represent the entire system 10, a zone at level 3 may correspond to a data center, a zone at level 2 may correspond to an area within the data center, and a zone at level 1 may correspond to a rack of hosts within the data center. As will be seen below, the fact that the logical hierarchy in FIGS. 3-4 is configured to match the physical topology of the system 10 makes the routing system 55 topology-aware. The fact that the routing system 55 is topology-aware permits network topology to be taken into account in routing decisions, e.g., by routing requests to hosts 15 that are topologically close to the clients. In another exemplary embodiment, the logical hierarchy in FIGS. 3-4 is not configured to match the physical topology of the system 10, which may be useful in achieving other design goals in some applications.

C. Interconnection and Communication of Hosts through Request Routers and Communicators Referring now to FIGS. 5-10, FIG. 5 is a block diagram showing an exemplary host 15 in greater detail. FIGS. 6-10 are block diagrams showing more specific examples of the interconnection of multiple hosts 15 such as that shown in FIG. 5.

Figure 5:
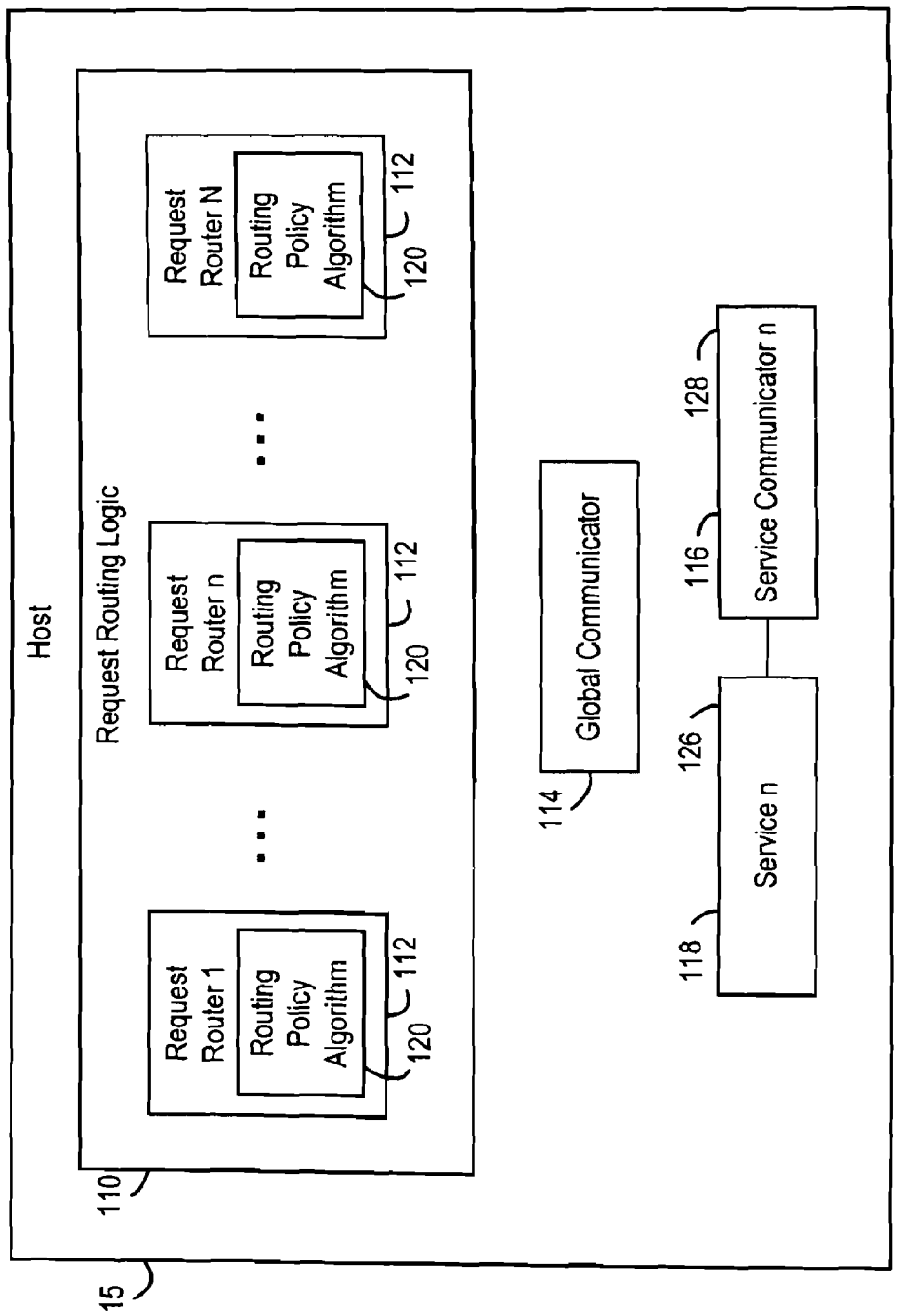
FIG. 5 is a block diagram of a host in the system of FIG. 3.

Referring first to FIG. 5, the host 15 comprises routing logic 110 including request routers 112, one or more communicators 114, 116, and one or more services 118. In an exemplary embodiment, as shown in FIG. 5, the host 15 is shown as comprising only one service 118. In other exemplary embodiments, a given server may host more than one service 118.

The request routers 112 are each responsible for handling client requests, finding a set of candidate hosts that execute a requested service 118, making a routing decision regarding the host 15 to which to dispatch a client request from among the set of candidates, and collecting client responses and dispatching them back to clients. Each request router 112 uses an associated routing policy algorithm 120 (described below) to route service requests from clients to one of the hosts 15 that executes the requested service 118. In an exemplary embodiment, a separate request router 112 may be executing at each host 15 and for each different service 118. Thus, the request routers 112 are labeled "Request Router 1" to "Request Router N," where N is assumed to be the total number of different services 118 operating in system 10. The request router 112 labeled "Request Router n" is assumed to be the request router associated with the $n^{th}$ service, corresponding to the service 118 hosted on the particular host 15 illustrated in FIG. 5. Because the request routers 112 are located with the hosts 15, the decision-making regarding where to route service requests may be performed in a decentralized fashion avoiding single points of failure. Although FIG. 6 shows a separate request router 112 for each different service 118, as will be appreciated, the individual request routers 112 within a given host 15 may also be combined into a single request router that provides request routing for multiple services 118.

Figure 6:
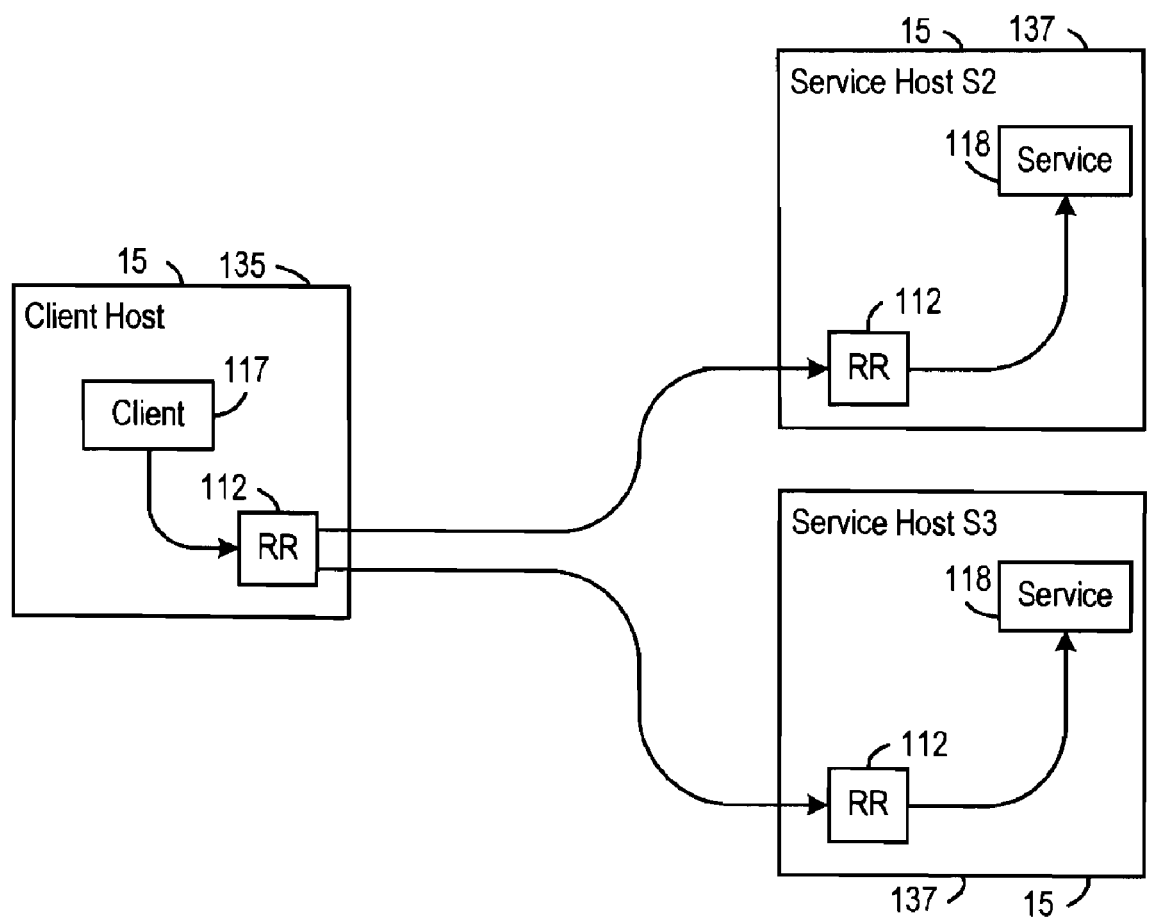
FIG. 6 is a block diagram showing routing of a service request to one of multiple candidate hosts.

FIG. 6 shows the interconnection of hosts 15 through multiple request routers 112. Thus, as shown in FIG. 5, a client host 135 has a client process executing thereon which transmits a service request. The service request may be transmitted to service hosts 137, which are assumed to host a common service 118. The client host 135 and the service hosts 137 each include respective request routers 112. On the client side, the request router 112 receives a service request from the client process 117, finds a set of candidate hosts that execute the requested service 118 (e.g., hosts S2 and S3 in FIG. 6), and makes a routing decision regarding the host 15 to which to dispatch the client request from among the set of candidates. On the service side, the request routers 112 receive the service request from the request router 112 of the client host 135, receive a response from the service 118, and dispatch the response back to the client process 117. Again, although only a single service 118 is shown in each of the hosts 15, it will be appreciated that the hosts 15 may each be hosting multiple services 118 and/or multiple worker processes for each service 118.

Figure 7:
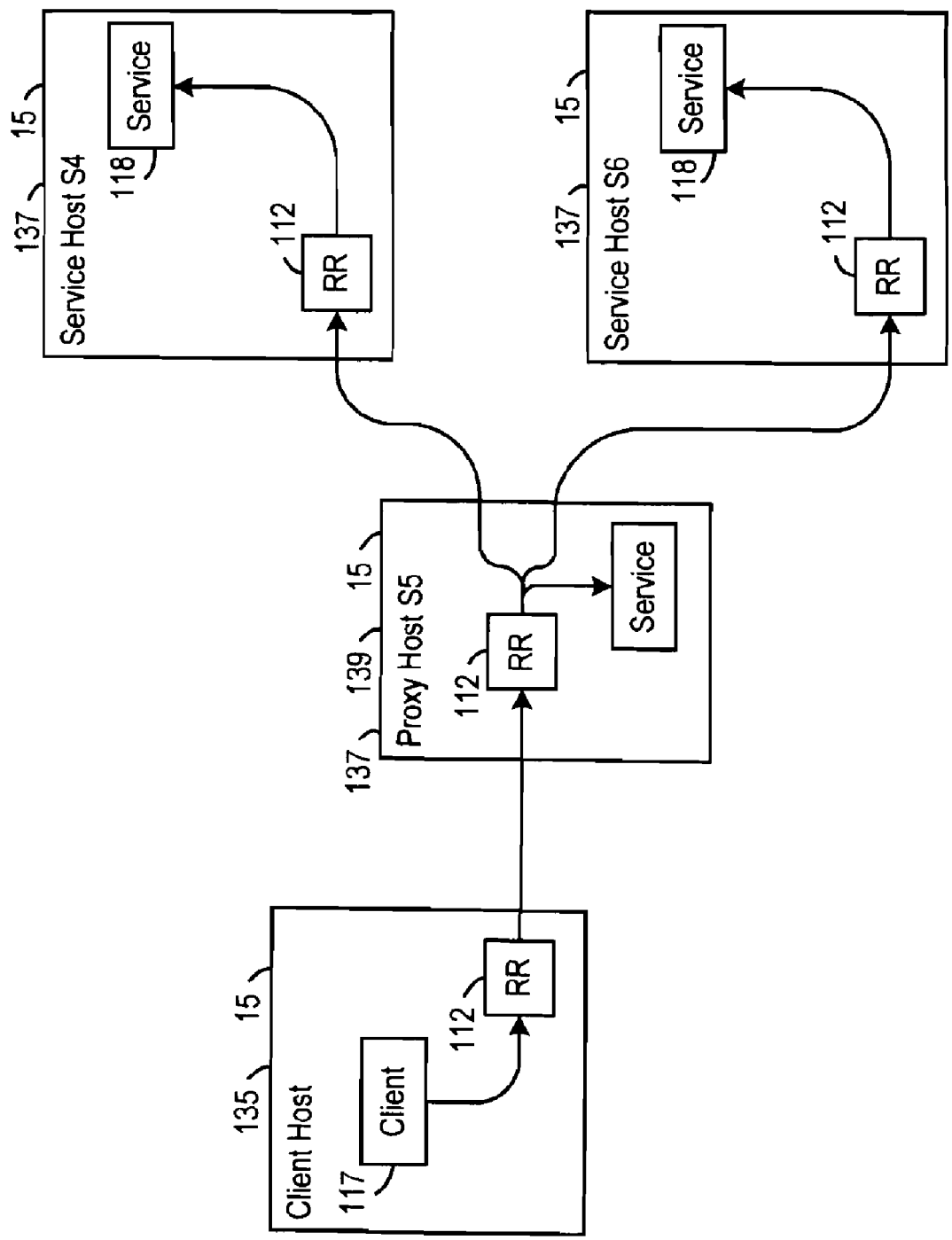
FIG. 7 is a block diagram showing routing of a service request to one of multiple candidate hosts through a proxy host.
Figure 8:
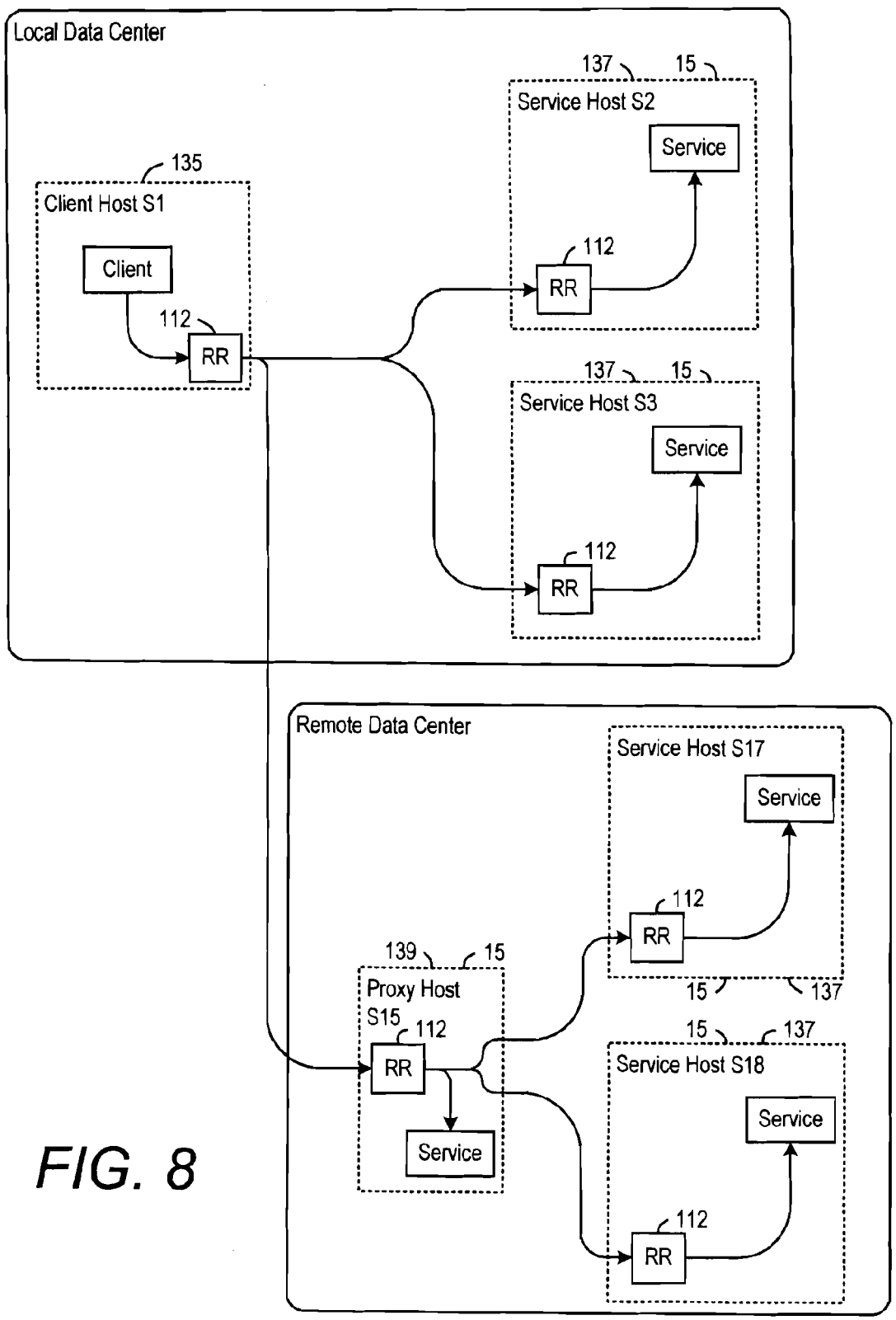
FIG. 8 is a block diagram showing routing of a service request to one of multiple candidate hosts located in different data centers.

FIG. 7 is similar to FIG. 6 but the hosts 137 that execute the service 118 include a proxy host 139. The proxy host 139 is disposed between the client host 135 and the remaining service hosts 137. The proxy host 139 executes the same service 118 that is hosted by the remaining service hosts 137 and has the option of processing the service request locally or dispatching the service request to the remaining service hosts 137, depending on the operation of the routing policy algorithm 120. For example, in the illustrated embodiment, the proxy host 139 may be at level 1 and may have the option of processing the service request locally or dispatching the service request to either host S2 or host S3, both of which are at level 0. FIG. 8 is similar to FIGS. 6 and 7 but shows an example in which service hosts 15 are located in different data centers. In FIG. 8, the request router 112 of the client host 135 has knowledge of the local hosts S2 and S3. The request router 112 also has the option of dispatching a service request to a proxy host S15 located in a remote data center. The proxy host S1 may then further dispatch the service request to lower level hosts, such as S17 and S18, located in the remote data center.

Figure 9:
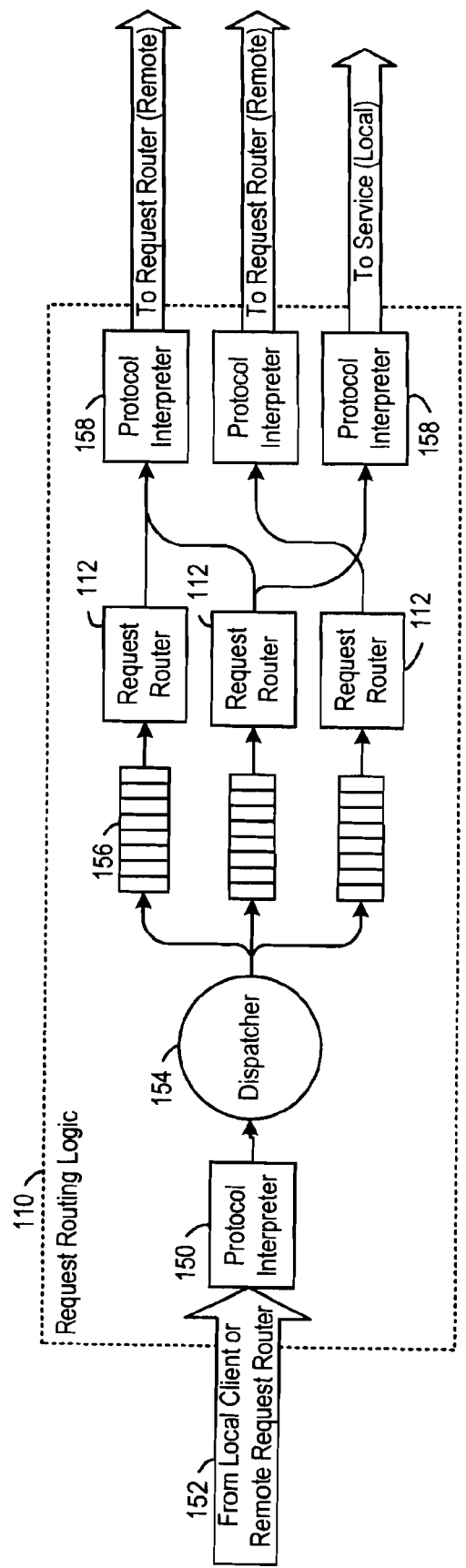
FIG. 9 is a block diagram showing request routing logic of the host of FIG. 5.

FIG. 9 shows a request routing logic 110 in greater detail according to an exemplary embodiment. In an exemplary embodiment, all service requests processed by a particular host 15 (whether locally generated by a resident client process or remotely generated by a process executing on another host 15) are processed by the request routing logic 110. The request routing logic 110 includes an incoming protocol interpreter 150 which receives a stream 152 of incoming service requests from one or more local client processes and from request routers 112 of other hosts 15. Each service request is parsed by the interpreter 150, which may be configured to support multiple protocols (e.g., HTTP, TCP, XML, and so on). The service request is then provided to a dispatcher 154, which stores information about registered services 118 such that service requests can be associated with a particular service queue 156. Although only three queues are shown, it will be appreciated that if the system 10 has N different services 118, then N different service queues 156 may be provided. The service queue 156 provides the service request to a request router 112 for a particular service 118 associated with the service request. The request router 112 selects the next routing hop for the service request, which may be for the service request to be sent to another host 15 or to a local process on the same host 15. As shown in FIG. 8, one of the request routers 112 has the option of routing service requests to a local service or routing the service request to the same service operating on a remote host 15.

Referring again to FIG. 5, the host 15 also comprises one or more communicators 114, 116. The communicators 114, 116 communicate information between hosts 15, including information regarding contact information for various services 118, availability of services 118, and so on, as described below. In an exemplary embodiment, the communicators 114, 116 use a hierarchical gossip-based, peer-to-peer protocol. For example, the gossip protocol disclosed in the following patents, hereby incorporated by reference, may be used: U.S. Pat. No. 6,724,770, entitled "Multicast Protocol with Reduced Buffering Requirements," filed Feb. 17, 2000, U.S. Pat. No. 6,529,953, entitled "Scalable Computer Network Resource Monitoring and Location System," filed Dec. 17, 1999, U.S. Pat. No. 6,411,967, entitled "Distributed Processing System with Replicated Management Information Base," filed Jun. 18, 1999, and U.S. Pat. No. 6,134,244, entitled "Method and System for Optimizing Layered Communication Protocols," filed Aug. 28, 1998. The structure of the hierarchy for the hierarchical protocol may be in accordance with the discussion above in connection with FIGS. 3-4 for the physical infrastructure presented in FIGS. 1-2. Due to the distributed manner in which all information is managed, the failure of any single network segment does not significantly impede the overall operability of system 10.

In an exemplary embodiment, multiple communicators 114, 116 are used. For example, a first (global) instance of the gossip protocol may be used by global communicator 114 to communicate information that is global and that is not limited in relevance to any particular service 118, and additional (service) instances of the gossip protocol may be used by the service communicators 116 to communicate service-specific information that is limited in relevance to a respective service 118. For example, a respective service communicator 116 may be used for each separate service 118. The global communicator 114 and the service communicators 116 may be agents of the different instances of the above-mentioned hierarchical gossip protocol executing on a given host 15. The use of separate communicators 114, 116 allows more targeted communication to occur, i.e., such that a particular host 15 is not burdened with the communication overhead of communicating service-specific information that is not directly relevant to the operation of the particular host 15. As will be appreciated, a single communicator may also be used which communicates both global and service-specific information.

The global communicator 114 may be configured to gossip about the entire set of services 118 and the hosts 15 that host them. The global communicator 114 aggregates information regarding the number of services 118 present in the system 10, the number of hosts 15 executing a given service 118, the contact information (e.g., IP address and port) for a small subset of hosts 15 of each service 118, the number of clients accessing the service 118, and so on. The global communicator 114 provides the dispatcher 154 (FIG. 9) with information regarding registered services 118.

Figure 10:
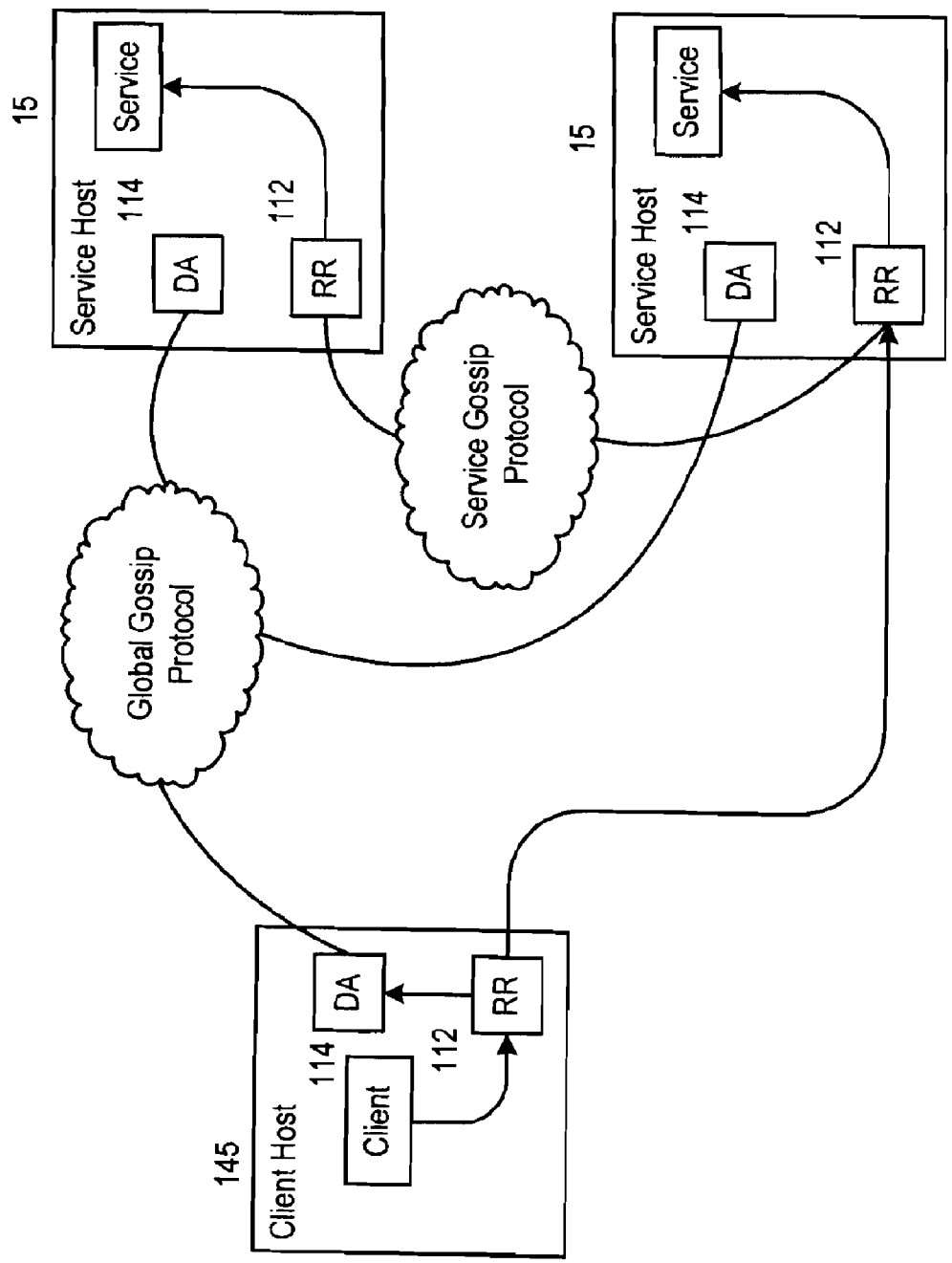
FIG. 10 is a block diagram showing routing of a service request to one of multiple candidate hosts using a global communicator and a service communicator.

Likewise, the service communicators 116 may each be respectively associated with one of the services 118 in system 10. The service communicators 116 may also aggregate the contact information for a set of hosts 15 which act as intermediate proxies for routing requests. The proxies need not be the same as the nodes 60-64 in FIG. 3, since they refer to the contact information (e.g., IP address and port) of the service communicators 116, and may be aggregated by a different aggregation function. FIG. 10 shows a client host 135 communicating with hosts 15 using a discovery agent (global communicator) 114, e.g., for purposes of service discovery. The service hosts 137 communicate with each other using service communicators 116. The client host 135 does not participate in this communication. The global communicator 114 executes on all the hosts 15, but the service communicator 116 is service-specific and only executes on hosts 15 hosting a particular service 118.

The communicators 114, 116 may be used to communicate global information and service-specific information between the hosts 15, such that each host 15 is provided with information concerning at least some of the zones 70-74 in the tree structure of FIG. 4. In an exemplary embodiment, each host 15 stores the state of all zones 70-74 on the path from its leaf zone 70 to the root zone 74 (including the root zone 74 itself). Further, each host 15 stores the state of sibling zones for all zones 70-74 on the path from its leaf zone 70 to the root zone 74. For example, in the example shown in FIGS. 3-4, node S1 knows about zones Root/A/A/A/B and Root/A/A/A/C (corresponding to hosts S2 and S3 at level 0), Root/A/A/B (at level 1), Root/A/B (at level 2), and Root/B (at level 3). However, S1 does not know any child zones of Root/A/B (at level 2), nor of Root/B (at level 3). Limiting each host 15 to a subset view of the tree structure decreases the amount of data stored by each host 15. Additionally, limiting each host 15 to a subset view of the tree structure also reduces the amount of data communicated over the network, thereby facilitating scalability.

Each of the nodes 60-64 may maintain their own status information and communicate the status information (i.e., using the communicators 114, 116 of the respective host 15) to higher level nodes for aggregation. The status information may be aggregated hierarchically, such that the zones 61-64 (i.e., the non-leaf zones) contain data aggregated from their respective child zones. Aggregated data may be used to give a summary of the system state to every participating node 60-64. The use of aggregated data decreases the amount of data that each node 60-64 stores and communicates with other nodes 60-64.

Figure 11:
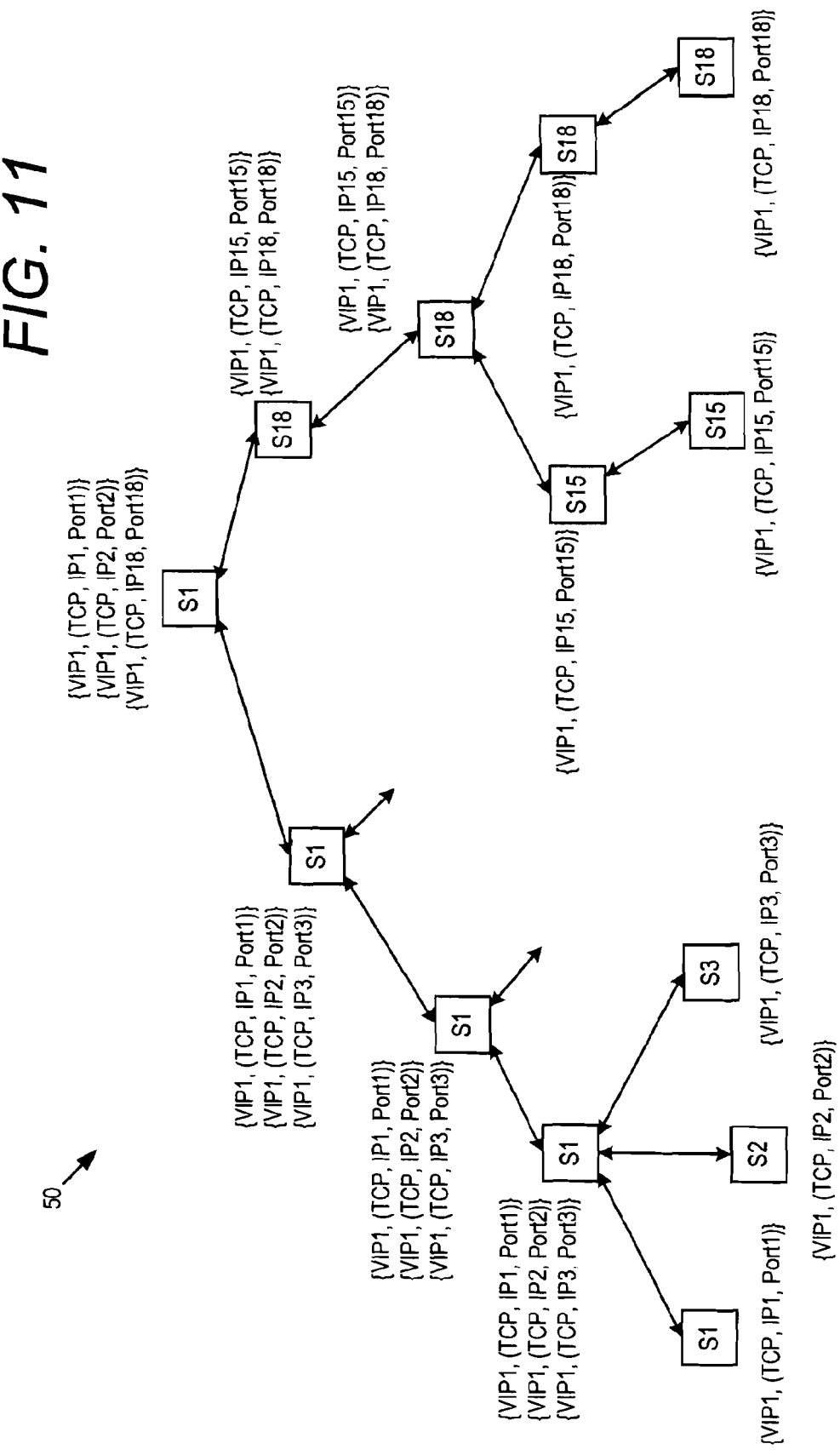
FIG. 11 shows operation of an aggregation function used to aggregate service contact information in the logical model of FIG. 3.
Figure 12:
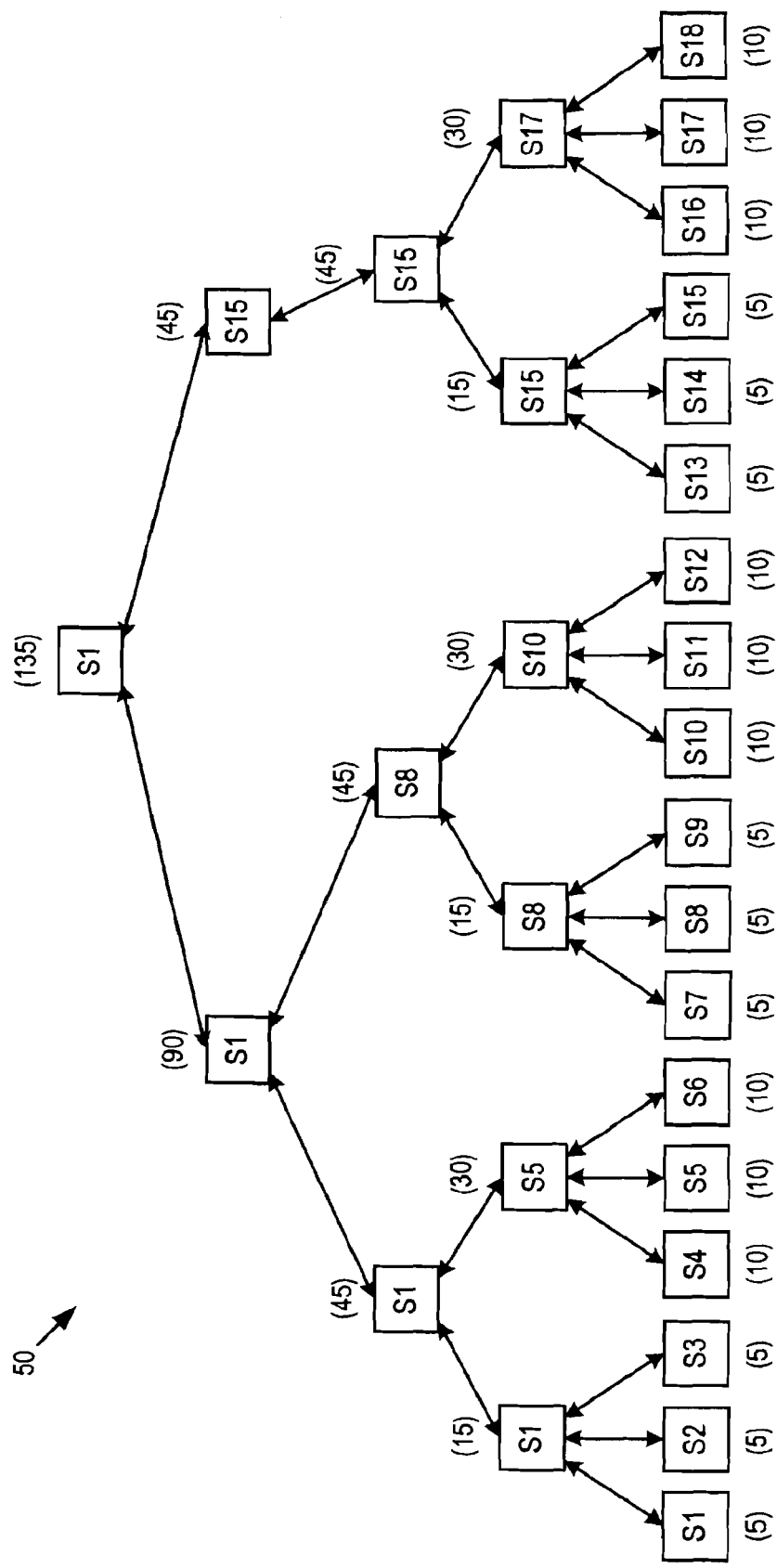
FIG. 12 shows operation of an aggregation function used to aggregate node capacity information in the logical model of FIG. 3.

Referring now to FIGS. 11-12, examples of the manner in which information may be aggregated is shown. In FIG. 11, a manner in which contact information may be aggregated for the service communicators 116 is illustrated. Each host 15 publishes a tuple (e.g. {servicex.company.com, (TCP, 10.1.1.12, 9000)}), comprising a service name (e.g., SERVICEX) or Virtual IP (e.g., servicex.company.com) and a contact tuple, which in turn comprises a protocol (e.g., TCP), an IP address (e.g., 10.1.1.12) and a port (e.g., 9000), into its local state. For each upper level zone 71-74, the contact information for the services 118 in the zones 70-73, respectively, in the immediately lower level (the zone children) is then aggregated. Since aggregation is recursive, the root node 64 ultimately identifies all the services 118 available in system 10. In FIG. 11, the aggregation includes a bounding function which limits the number of contacts to an upper bound (e.g., three contacts per zone, in the illustrated example). The use of a bounding function in this manner reduces the amount of information that is aggregated as the number of hosts increases, thereby enhancing scaleability. As will be appreciated, a variety of factors may be used to select which hosts 15 are deleted from the contact information during aggregation, such as performance metrics and whether any other hosts 15 from the same zone are already included in the bounded contact list. Any information that is used for host selection during aggregation may be included in the information that is aggregated. The same process may also be used to aggregate other types of information using other aggregation functions, such as latency information or capacity information. For example, in FIG. 12, the process may be used to aggregate capacity information using the function sum( ), which returns the sum of the capacity from among the zone children. For each upper level zone 71-74, the capacities of the zones 70-73, respectively, in the immediately lower level (the zone children) may be aggregated. Since aggregation is recursive, the root node 64 ultimately contains the total capacity of all hosts 15. For example, the capacity of each host 15 (at level 0) S1, S2, and S3 is 5, the aggregated value of their parent zone (at level 1) is 15. The aggregation function may be configured such that double counting is avoided, that is, so that the capacity of host S1 is not counted both at level 0 and at level 1. It may be noted that even if the same host 15 acts as a proxy in different zones, it may behave differently based on the zone it represents. For example, the total capacity represented by host S1 at level 2 is the sum of the capacities of hosts S1, S2, S3 and whatever is represented by host S5 at level 1. However, the capacity of host S1 at level 1 is only the sum of hosts S1, S2 and S3. After the aggregation function is applied to all the other zones, the capacity of the root node 64 is 135, as shown. Data may be aggregated using substantially arbitrary aggregation functions, which may be dynamically inserted into the system, removed, and modified.

The states of different hosts 15 may be kept eventually consistent using a series of gossip protocol instances, for example, one for each level in the tree structure. The gossip protocol may use point-to-point messages and take into account network boundaries, e.g., switches and routers. The gossip protocol may minimize communication across boundaries by gossiping less frequently to far zones. Aggregating information and minimizing communication across boundaries helps keep bandwidth consumption low. In an exemplary embodiment, the routing system 55 also maintains an eventually consistent membership protocol using a gossip failure detection arrangement, as known in the art. An example of such an arrangement is disclosed, for example, in R. van Renesse, Y. Minsky, and M. Hayden, "A gossip-style failure detection service," Technical Report TR98-1687, 28, 1998.

In an exemplary embodiment, multicasting may be used for initial discovery, e.g., to permit hosts 15 to discover each other. The network infrastructure for the system 10 may support multicasting to a group that corresponds to each zone in the network topology, i.e., one group for a level 1 cluster, one group for a data center, and so on. Hosts 15 (nodes 60-64) may periodically multicast on a scoped multicast address at every level in the tree structure. In an exemplary embodiment, in order to reduce multicast traffic, each host 15 multicasts at a particular level only once per period with a probability inversely proportional to the number of nodes at that level. Hence, on the average, only one host multicasts per discovery period at each level.

In an exemplary embodiment, service advertisement may be achieved through automated registration. For example, at startup, each service 118 may register with its local request router 112 (i.e., the request router 112 on the host 15 upon which the service 118 is executing). The request router 112 may then use the global communicator 114 to locate and connect to the gossip protocol instance for the service 118 (or create a new one, if necessary). Clients may then be permitted to find services 118 and hosts 15 transparently using the service name (e.g., virtual IP address). In the event of a failure of the service 118, its registration may be removed from the information that is obtained through aggregation. Additionally, in the event of a failure of the host 15, the registration of the service 118 is automatically removed. This is because the host 15 is responsible for writing its own local state and, without the host 15 to write its local state, the information is not included in the information that is aggregated on other hosts 15. Thus, there is no need for deregistration in case of failure of a service 118 or host 115. This arrangement avoids the need to manually configure clients with service-specific configuration information, such as hard coded IP addresses of services 118. This arrangement also avoids the need for explicit registration of services 118 with a central registration entity, which in turn promotes decentralized system administration. Furthermore, since the state for each node 60-64 is writable only by the node itself, a misconfiguration of one node will not affect other nodes.

II. Service Discovery and Host Selection

The routing system 55 divides the problem of finding the best host 15 (that executes the requested service 118) to which to route a request into two subproblems: (i) service discovery (i.e., discovering the candidate set of hosts that host a given service), and (ii) best host selection (i.e., selection of the best host among them to serve the client request). An exemplary service discovery and request routing process is described in Section II(A) below in connection with FIGS. 13-14. Exemplary procedures for selecting a best host during the request routing process of FIGS. 13-14 are described in Section II(B) below.

A. Exemplary Service Discovery and Request Routing Process

In an exemplary embodiment, service discovery and host selection are performed in a decentralized fashion using the global communicators 114 and service communicators 116 of the various hosts 15. Using this arrangement, a client host 135 finds the set of hosts 137 that together execute a given requested service 118. Subsequently, the client host 135 executes its own request router 112 to select the best host 137 to which to dispatch its request. A service host 137 that receives the client request may process the request locally or may forward the request to another service host 137 (thereby acting as an intermediate proxy host 139, as in FIG. 7). This decision is made by the request router 112 of the service host 137 based on the associated routing algorithm 120.

Figure 13:
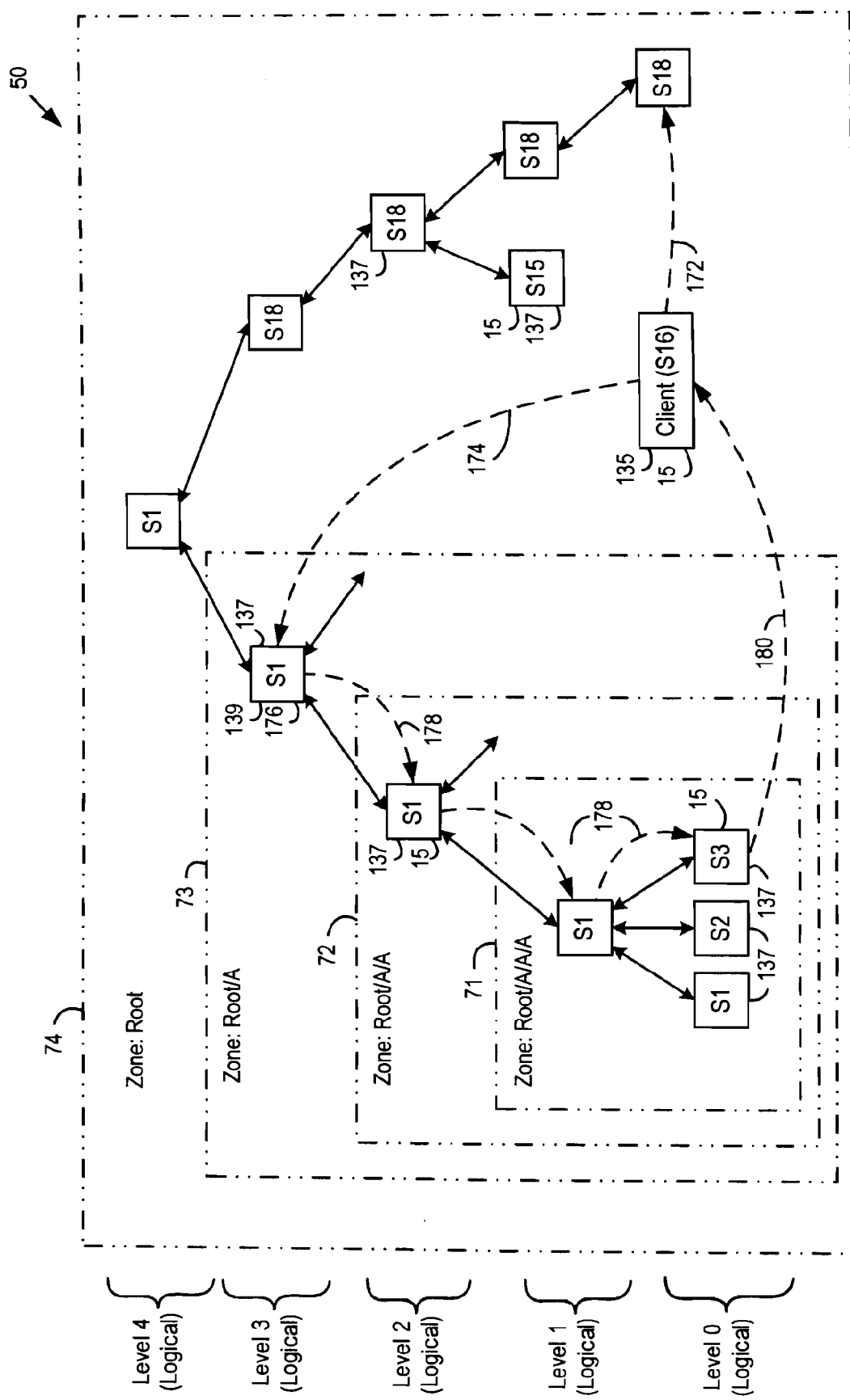
FIG. 13 is a block diagram showing a client request being routed in a request routing system according to an exemplary embodiment.
Figure 14:
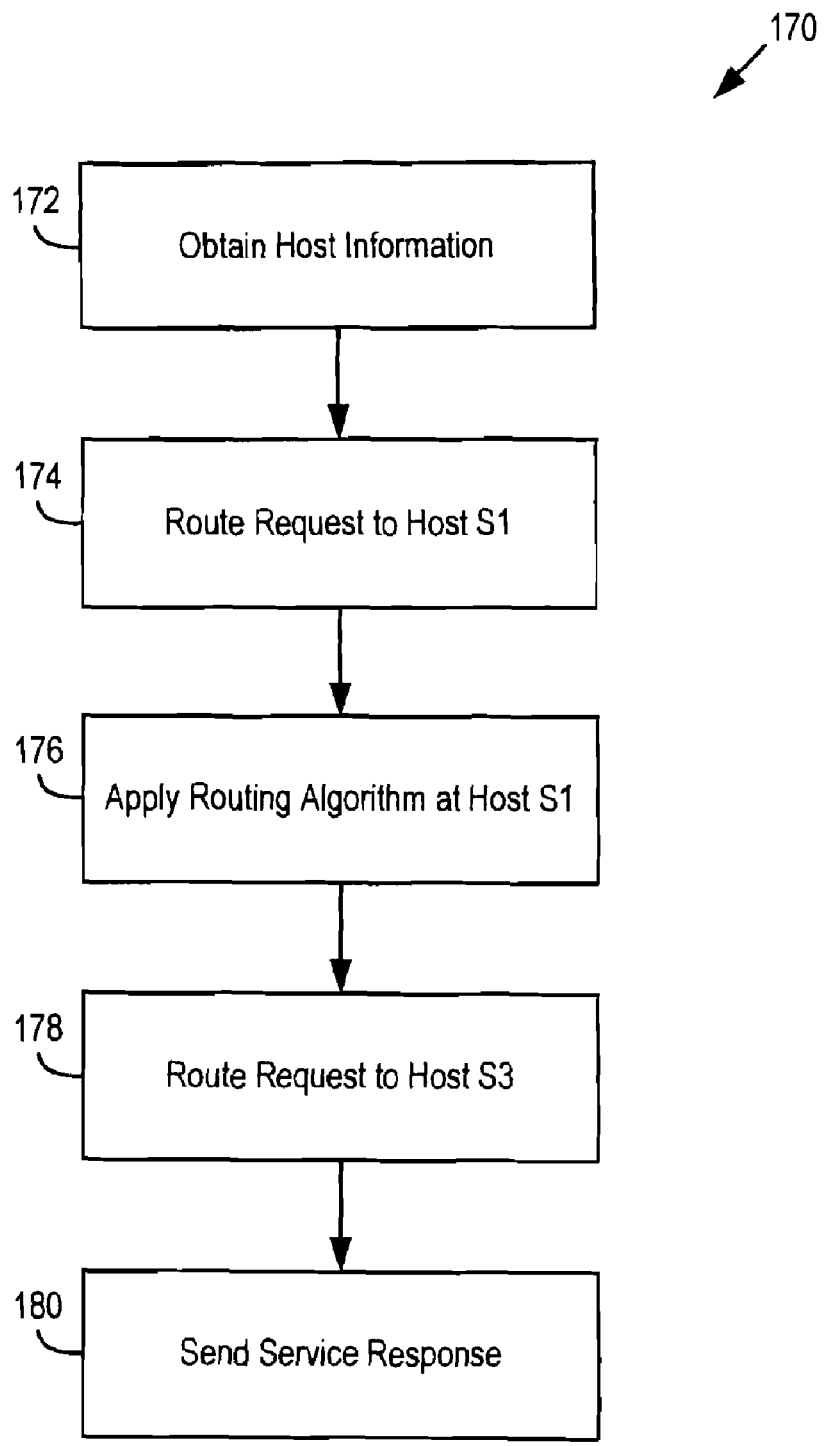
FIG. 14 is a flowchart of the process shown in FIG. 13.

Referring now to FIGS. 13-14, FIGS. 13-14 show this process in greater detail. When a client process initiates its first request to a service 118, the service request is received by a request router 112 of the client host 135. At step 172, the request router 112 of the client host 135 discovers information about the service 118. Particularly, the request router 112 uses its global communicator 114 to find the nearest contact hosts 137 of the service 118, where "nearest" refers to the service host 137 that is the fewest number of network hops away. Subsequently, the request router 112 of the client host 135 connects to the service communicator 116 of the service host 137 and downloads information regarding the set of hosts 137 that host the service 118 (i.e., that host's view of the tree structure for the respective service 118). In the example given in FIG. 12, if a client host 135 connects to host S18, the list of candidate service hosts 137 it learns about is host S18 (at level 0), hosts S15 and S18 (at level 1), host S18 (at level 2), hosts S1 and S18 (at level 3), and host S1 (at the root level). As described above in connection with FIGS. 3-4, each host 15 stores the state of all zones 70-74 on the path from the respective leaf node to the root node, as well as their sibling zones. In the illustrated example, the client host 135 may, for example, be host S16 in FIG. 3, resulting in S18 being the topologically closest host.

At step 174, once the request router 112 of the client host 135 receives the list of candidate hosts 137 from the service communicator 116, the request router 112 of the client host 135 selects the best host 137 to which to dispatch the given request and dispatches the service request to the selected host 137. As indicated above, in some embodiments, the zones 70-74 may have multiple designated representative nodes, e.g., a primary representative and a secondary representative. In such circumstances, the logical point of dispatch may be the respective zone 70-74 rather than any individual host 137.

At step 176, the service request is received by the request router of the selected host 137. Once the service request is received, the request router 112 of the selected host 137 has two options: (1) it can handle the service request locally, or (2) it can forward the service request to another node at a lower level. Even though it is desirable for hosts 15 to handle all requests locally, this can lead to overloading of the hosts. Hence, each request router 112 may be configured to perform a proper balancing between serving requests locally and forwarding the service requests to other hosts 137. Additionally, when the service request is forwarded to another host 137, if the first server 137 is more heavily loaded than the second server 137, then the end-to-end latency of the response to the service request may be reduced. This balancing may be performed using the routing algorithm 120, described in greater detail below.

In the example of FIGS. 13-14, the outcome of the routing algorithm at step 176 is shown to be that the service request is forwarded to another node at a lower level. Accordingly, at step 178, the service request is forwarded to the host S1 at level 2. In the event of the request being forwarded to another node, the system 10 may be configured to ensure that routing loops do not occur by requiring that service requests are always forwarded to a zone deeper in the sub-tree of the zone to which it was addressed. Service requests entering the request router 112 of the root node 64 are logically directed to the root zone 74, thus that service request can be routed anywhere in the tree structure. For example, in FIG. 13, host S1 can route to host S2 only if it receives a service request logically directed to level 1 or higher. On the other hand, if host S1 receives a request directed to it at level 0, then the service request is processed locally. Thus, in FIG. 13, the first two routing hops are from host S1 at level 3 to host S1 at level 2, and from host S1 at level 2 to host S1 at level 1, respectively. In other words, the service request is routed to the host S1, but is logically routed to lower levels in the tree structure. Thereafter, the next routing hop is from host S1 at level 1 to host S3 at level 0. Although not explicitly shown in FIG. 14, it will be appreciated that the request router 112 of a respective node applies its respective routing algorithm 120 as described above in connection with step 174 for each routing hop in the tree structure.

At step 178, the service request is routed to the service host S3, where it is ultimately serviced. The response to the service request is then retuned to the client host 135 at step 180. When the response is finally returned, the response may be sent through a path which is different from the routing path through which the service request came. For example, the request router 112 of the service host 137 may send the response directly to the request router 112 of the client host 135 (e.g., via a TCP connection). On the return path, it is not necessary to engage in best host selection since the destination host for the response (i.e., client host 135) is known. This avoids incurring additional routing overhead and reduces the end-to-end latency of the request.

In an exemplary embodiment, after the process depicted in FIGS. 13-14 has been performed once by a client host 135 with respect to a specific service 118 (i.e., after the first service request to the service has been initiated and a response has been received), the client host 135 may register itself as a listener to the gossip protocol instance associated with the service communicator 116. This permits the client host 135 to receive a continuous stream of updates regarding the state of the service 118. For example, in FIG. 13, the host S18 may communicate changes to the service tree structure to the client host 135 as the changes occur by way of a direct connection (e.g., a TCP connection which is kept open). By registering itself as a listener, the client host 135 obtains updates for services 118 in which it is interested. In subsequent repetitions of the process 170 shown in FIGS. 13-14, the client host 135 may therefore skip the step of discovering information about the service 188 (step 172), and proceed directly to step 174. Also, because the client host 135 is only registered as a listener, the client host 135 does not need to execute additional instances of the service communicator 116, which may otherwise increase the load on the client host 135. Given that some hosts 15 in system 10 may access many services 118, avoiding the additional overhead of executing additional instances of the service communicator 116 may be desirable.

B. Routing Policy

1. Latency-Aware Dispatch

The routing algorithm 120 is responsible for selecting the best host 137 to service a service request from a candidate set of service hosts 137. In an exemplary embodiment, the routing algorithm 120 selects the best host 137 using an approach that reduces average end-to-end service latency for client service requests.

Particularly, in an exemplary embodiment, the routing algorithm 120 uses a randomized (i.e., pseudo-randomized), latency-aware dispatch policy in which zones are weighted based on their expected end-to-end latency. For example, if $\overline{lat} = \{lat_1, lat_2, \ldots, lat_n\}$ is the vector of expected latencies when sending a request to a candidate set of zones $(Z_i \ldots Z_n)$, then $$P_i = \frac{\frac{1}{lat_i}}{\sum_{j=1}^{n} \frac{1}{lat_j}} \quad (1)$$

where $p_i$ is the probability of dispatch to a zone $Z_i$. As will be appreciated, zones are logical groupings of hosts 15 and are treated as entities unto themselves merely for purposes of performing calculations in connection with the latency aware dispatch policy. Requests logically dispatched to zones and are physically dispatched to hosts.

From Eq. (1), it follows that the probability of dispatch to any particular zone $Z_i$ within a candidate set of zones is inversely proportional to the expected end-to-end latency when sending the service request to the particular zone $Z_i$. For example, if there are two candidate zones $Z_1$ and $Z_2$, and if the two candidate zones $Z_1$ and $Z_2$ have relative latencies of 5 and 10, then the randomized strategy may dispatch a service request to zones $Z_1$ and $Z_2$ with a probability of 0.67 and 0.33, respectively.

The expected end-to-end latency values $lat_j$ for a request from a client host $C_j$ when served by zone $Z_i$ at level 1 are computed based on Eq. (2) as follows:

$$lat_{ij} = NL_{ij} + RL_i + SL_i(l) \quad (2)$$

where
- (i) $NL_{ij}$ is the Network Latency, that is, the time incurred by the request in traveling through the network from the client ($C_j$) to the zone ($Z_i$) (e.g., if a network has higher latency properties than this latency is higher);
- (ii) $RL_i$ is the Redirection Latency, that is, the time incurred due to redirection overheads (e.g., if a request travels through multiple request routers 112, then this latency is higher); and,
- (iii) $SL_i$ is the Service Latency, that is, the time taken by a zone to execute a given service request. The Service Latency includes both the time taken by the service 118 to execute the service request (which depends on the processing power of the hosts 137 within the zone) and the time spent by the service request in the queue of the host 137 waiting to be serviced.

It may be noted that the expected service latency $SL_i(l)$ for a zone is dependent on the level of the zone. The reasons for this is as follows: If the zone is at a higher level, then its service latency is the weighted average of the time the request will take to execute when forwarded to its children, including the Network Latency. For example, the service latency $SL_1(0)$ of a zone at level 0 is just its own measured service latency. On the other hand, the service latency $SL_1(1)$ of a zone at level 1 is the weighted average of $SL_1(0)$, $(NL_{1,2}+RL_2+SL_2(0))$, and $(NL_{1,3}+RL_3+SL_3(0))$, where $NL_{i,j}$ is the Network Latency from zone $Z_i$ to zone $Z_j$ as measured by zone $Z_i$. It may be noted that, in the example given in FIG. 13, Network Latency for host S3 at level 0 is 0, since the dispatch is to a process executing within the host S3.

By performing routing based on measured latency, as in Eq. (2), the routing algorithm 120 is configured to be dynamic and adaptive (i.e., it adapts to changes in the load of individual hosts 15). For example, if the service hosts 137 within a zone become heavily loaded, the service latency $SL_i$ for the zone increases, decreasing the probability that subsequent service requests will be routed to the zone (i.e., until it becomes less heavily loaded). Likewise, the routing algorithm 120 is able to adapt to changes in client request rate and the addition/removal of new service hosts 137 executing a particular service 118. The routing algorithm 120 is also configuration independent, since it relies on end-to-end latency, which may be compared in straightforward manner between zones, and does not rely on any manually configured parameters (e.g., hosts' relative processing capacity and memory capacity) to make routing decisions. Different relative processing capacities and memory capacities are reflected in measured service latencies, causing zones with less powerful hosts 135 to receive fewer service requests when their service latencies rise above the service latencies of other service hosts 137. By also taking into account the network latency $NL_{ij}$, the routing algorithm 120 is also able to take into account different parts of the networking infrastructure of system 10 which may have different bandwidth and latency characteristics. This avoids high latencies if the hosts 15 are spread across different data centers, especially in a WAN environment. Thus, heterogeneity in host resources and networking capabilities is taken into account.

By focusing on end-to-end latency rather than evenness of workload sharing, response time for client hosts 135 may also be improved. A given host 137 may be selected based on minimization of end-to-end latency, even though selection of the host 137 results in uneven load distribution among hosts. For example, if there are two candidate hosts 137, one of which is lightly loaded but in a remote data center, the closest host 137 may be selected if doing so is likely to result in a lower overall end-to-end latency. The closest host 137 may be selected even though it may already be more heavily loaded than the service host 137 in the remote data center.

Additionally, as previously indicated in connection with Eq. (1), the dispatch strategy used by the routing algorithm 120 is a randomized strategy. A randomized dispatch strategy avoids a "herd effect" that may be encountered when dispatching requests to a host that is perceived to be the least loaded, particularly in situations where the load/latency information the clients are operating on is stale. In such situations, the host that appears to be under-utilized may become quickly overloaded, and then the "herd" stampedes another host, and so on. A randomized dispatch strategy avoids the dispatching of all service requests to any one (least-loaded) host but, rather, dispatches service requests to multiple hosts including more heavily-loaded hosts (albeit with a lower probability than the less heavily loaded hosts). In the exemplary embodiment described above, the routing algorithm 120 uses a latency-based randomized dispatch strategy in which the weighting coefficients for the randomized dispatch are determined based on measured latencies. In other exemplary embodiments, the weighting coefficients for the randomized dispatch may be determined based on other parameters, such as the relative capacities of the hosts 137. For example, if zones $Z_1, Z_2, \ldots, Z_n$ is the list of zones known by a request router 112, and $c_1, c_2, \ldots, c_n$ are their respective advertised capacity, then each request router 112 may compute a set $P = p_1, p_2, \ldots, p_n$, which will be the probabilities of routing to each of these zones, such that $$p_i = c_i \Big/ \sum_{j=1}^{n} c_j.$$

The capacity, for example, may be the number of processes executing the relevant service 118, properly calibrated to take into account the capabilities (e.g., CPU, memory, IO bandwidth, and so on) of hosts within the zone.

Additionally, in the exemplary embodiment, both the service discovery and routing decisions occur at individual hosts 15. Service discovery and routing decisions are therefore decentralized, permitting the routing system 55 to avoid a single point of failure, both in terms of hosts 15 and network segments. Likewise, as previously described, service registration may also be performed in a decentralized manner.

Figure 15:
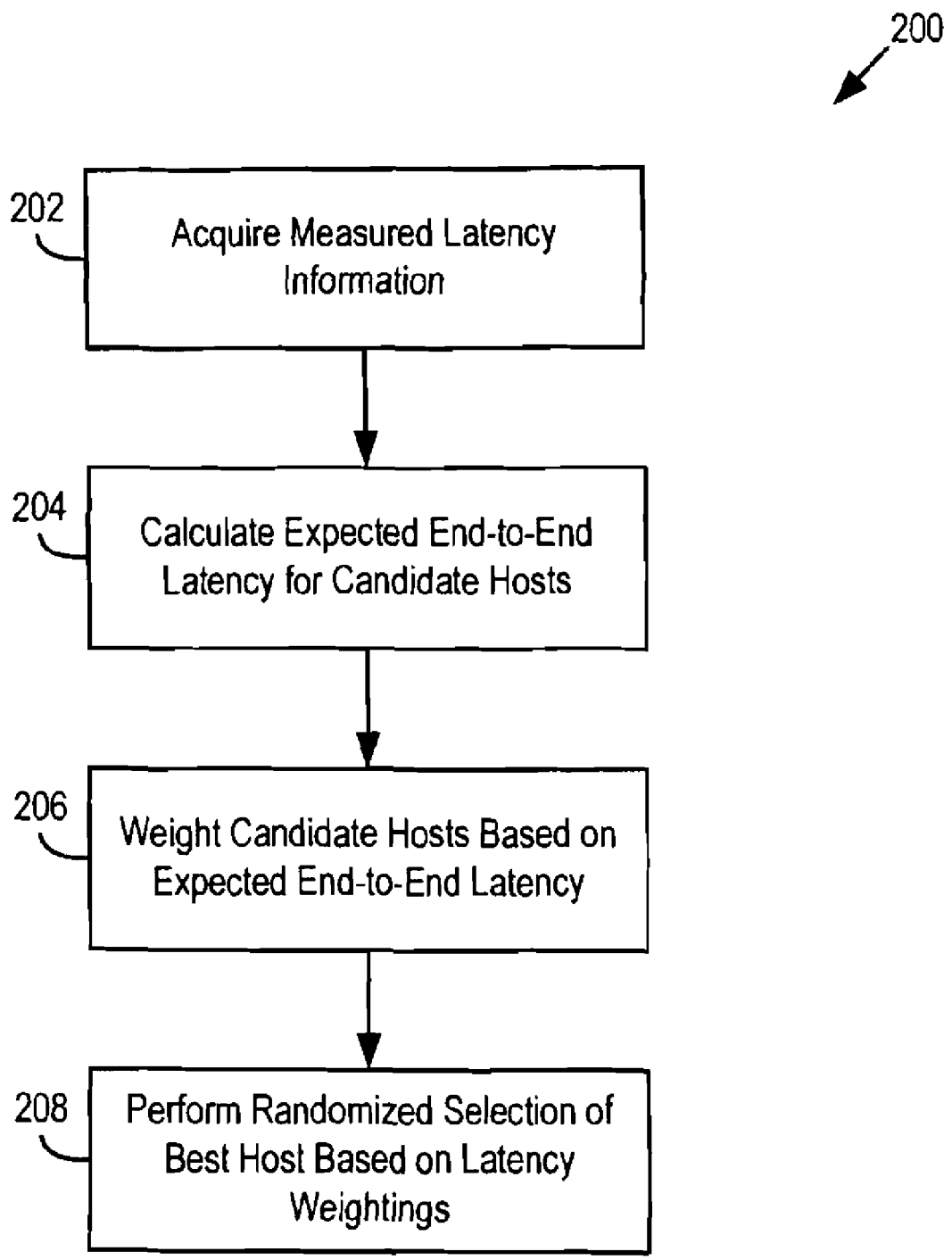
FIG. 15 is a flowchart of a process for best host selection in connection with the process of FIG. 13.

Referring now to FIG. 15, FIG. 15 is a flowchart showing a process 200 for best host selection. The process 200 may, for example, be implemented in connection with each of the routing hops described above in connection steps 134-136 of FIGS. 13-14 and may incorporate the randomized dispatch technique described above in connection with Eqs. (1)-(2). As indicated above, requests are logically dispatched to zones and physically dispatched to hosts. Accordingly, although in some instances reference is made to hosts 137, it will be appreciated that the dispatch policy described above relative to zones is also applicable to the discussion of FIG. 15.

At step 202, latency information is acquired from the service hosts 137. The service latency may be first learned through aggregation functions as discussed above in connection with FIG. 12, and subsequently through information received as responses to service requests are routed to the client host 135. Initially, for example, in the absence of feedback, all request routers 112 may start with equal dispatch probabilities for their next hop. Then, during request routing, each host 137 in the routing path may append the average SLi and RLi for the service hosts 137 in their sub-trees, i.e., from those to which they dispatched requests. This information may be used to update the information base in the client host 135. For example, in FIG. 13, if host S3 receives a service request from a client host 135 through the path (S18, S1, S3), the reply may be sent back to the request router 112 of the client host 135 directly. However, the host S3 may send aggregated completion notifications to host S1 which in turn may send notification to host S18, and so on, through the path (S3, S1, S18). Host S1 may put the values of $RL_1$, $S1(3)$, $S1(2)$, and $S1(1)$ in the metadata, and this information may be used to update the information in the request router 112 in the client host 135. Each request router 112 may transmit a completion notification that contains the same meta-data as the response itself, and such notifications may then be periodically and asynchronously sent back along the request path.

Figure 16:
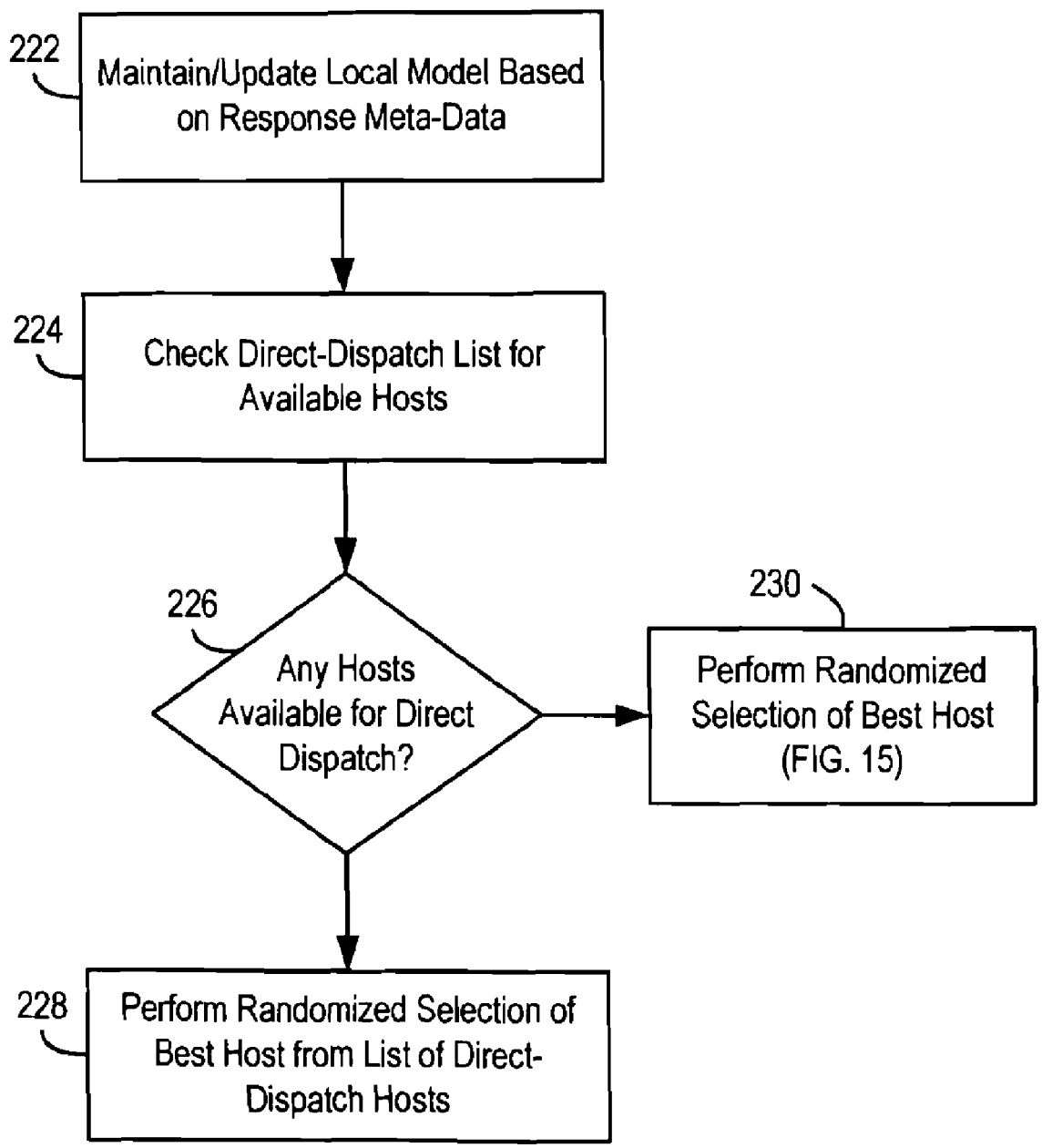
FIG. 16 is a flowchart of a process for best host selection including a direct dispatch option in connection with the process of FIG. 13.

The meta-data in such notifications, as well as that in the reply message itself may be used by request routers 112 to update local models of remote zones 70-74 and the respective nodes 60-64. The meta-data may be used to provide client hosts 135 and intermediate proxies with relatively up-to-date information for each host regarding its capacity, average service latency, expected load, and so on, thereby promoting efficient routing of requests. The information received by the client host 135 in this manner may be more current than information obtained through aggregation using the service communicator 116. Accordingly, in an exemplary embodiment, request routers 112 may be configured to give the information higher confidence and to prefer it. Moreover, the meta-data may contain information regarding hosts 137 which the request router 112 did not know through the service communicator 116 (e.g., host S3 for client host 135). In that case, the request router 112 may add these hosts 137 in its routing table to use later for direct dispatch, as described below in connection with FIG. 16.

With regard to the network latency, the network latency to a service host 137 from the client host 135 may be measured (e.g., using the round trip time (RTT) value obtained from TCP SOCKINFO system calls). Although this may not reflect the bandwidth of the network; other network monitoring tools may be used to enhance this model, if desired.

At step 204, the information obtained during step 202 is used to calculate the end-to-end latency for each of the candidate hosts, e.g., using Eq. (2) as described above. At step 206, the candidate hosts 137 are weighted in accordance with the end-to-end latencies for each of the hosts. At step 208, the best host is selected based on the weightings for each host 137 in the set of candidate hosts 137. The request is then routed to the selected host 137.

2. Direct Dispatch

In an exemplary embodiment, the client host 135 may be permitted in some circumstances to dispatch service requests directly to a leaf node 60 based on information contained in a direct dispatch list. By dispatching to hosts 15 within the direct dispatch list, rather than to intermediate proxies, the system avoids any redirection latency (RL) thereby reducing overall end-to-end latency. The client host 135 may also be permitted to dispatch to intermediate proxies in the same manner, thereby achieving some of the benefits of dispatching directly at a leaf node 60 and some of the benefits of dispatching at the root node 64.

At step 222, the client host 135 maintains and updates its local model of the tree structure (including latency information) based on the meta-data received in responses to service requests. In an exemplary embodiment, when the latency data is provided by the service hosts 137, the clients hosts 135 include a time-to-live (TTL) value for the meta-data. For example, the TTL value may be attached to the meta-data values updated by the hosts 137 that served and routed the request. Upon the receipt of the response, the request router 112 of the client host 135 adds the end-host in a direct-dispatch list, but only for TTL seconds. (If the request router 112 of the client host 135 already knows a particular host 137, the TTL value may merely be updated.)

The TTL value is a time period during which the reported load of a service host 137 (learned through meta-data, as described above) is expected to be valid. The TTL value may be set by the host 137 based on its current utilization (e.g., which may be measured as the fraction of processes which are busy, and which may be smoothed over time). In an exemplary embodiment, the utilization of a host 15 is divided into three zones: underloaded, nearloaded and overloaded. A host 15 may be designated as underloaded if its utilization is less than 0.5, nearloaded if its between 0.5 and 0.8, and overloaded otherwise. The use of such threshold values avoids overloading of hosts through direct dispatch. If a host 15 is underloaded, its TTL value may be high (e.g., 3 minutes) and may decrease with increasing load. Effectively, the TTL value may be thought of a measure of how long the host wants to be remembered by a client host 135.

At step 224, the next time the request router 112 of the client host 135 needs to dispatch a request, the request router 112 first checks the direct-dispatch list and, at step 226, determines whether any service hosts 137 are available for direct dispatch. At step 228, if there are hosts 137 available for direct dispatch, then the client host 135 performs latency-based weighted dispatch between these hosts 137. On the other hand, at step 230, if the list is empty, then the client host 135 switches to regular routing through the list of hosts 137 it knows through the service communicator 116. The list may become empty if hosts 137 become overloaded. For example, if a host 137 gets overloaded (e.g., due to background administration tasks such as disk backup, or due to a long-executing service request), then the host 137 may set its TTL value to zero, thereby avoiding direct dispatch and allowing dispatch only through proxies learned using the service communicator 116.

Once a host 137 is added to the direct-host list, and if the request router 112 always dispatches its requests to this host, the list will always contain only a single element thereby potentially causing a herd-effect. To avoid such a herd effect and to facilitate the population of more hosts 137 into the direct-host list, the direct-host list may be used only with a certain probability (e.g., a configurable default value of 0.95). In an exemplary embodiment, the default probability value may take into account a tradeoff between redirection latency (RL) reduction and learning about new hosts to avoid the herd-effect.

In an exemplary embodiment, the client host 135 may be permitted to dispatch service requests at any level in the tree structure. For example, during a near-loaded scenario, it may be desirable to send a request to proxies in the higher levels (level 1 or higher in the service communicator 116 tree structure) as they may represent more capacity than a single end-host, and they may perform better load balancing through the aggregation of multiple client workloads in a more centralized queue.

To permit dispatching at intermediate levels of the tree structure during request routing, each service host 137 in the request path adds its status information along with a TTL value to the meta-data. Upon the receipt of this meta-data, the client request router 112 adds these hosts 137 in the direct-dispatch list. The TTL value of the service proxies may increase with increasing hierarchy depth (i.e., proxies at level 3 may have a higher TTL than proxies at level 2). The TTL values may also be determined based on an aggregation of the utilization of all hosts 137 within the subtree represented by the proxy, where the aggregation function is the weighted average of utilizations of all hosts within that subtree. By remembering proxies higher in the hierarchy for a longer time, the request routers 120 may smoothly transition between dispatching directly to end-hosts 137 (in order to avoid Redirection Latency) and a more centralized scheduler (which would reduce queuing latency at the end-host and hence Service Latency). Centralized queuing may be beneficial in high load situations as it uses a common entry point for queuing all client requests and allows the system to do effective dispatch of requests and/or load shedding. As loading increases, service requests tend to be dispatched at higher levels, because the TTL values are smaller. Lower level hosts 137 are forgotten more quickly than higher level hosts 137, which are assigned higher TTL values. As loading decreases, the TTL values increase, causing service requests to be directly dispatched to lower levels in the tree structure. Because the service requests are dispatched at a lower level, the routing latency decreases. Thus, routing algorithm 120 adaptively dispatches loads at an appropriate level in the tree structure based on current loading conditions to attain the fastest response time. The request routers 120 may therefore make an appropriate tradeoff between network locality, redirection overhead, and end-host queuing, with the ultimate goal of reducing end-to-end latency.

3. Load Prediction

As described above, each request router 112 may append its load information (e.g., predicted SL and RL) in the meta-data of the response sent back to client hosts 135 and the request routers 112 upstream in the routing path (which are informed through completion notifications). Since client hosts 135 and intermediate proxies use this information to route requests, it is desirable for this information to avoid being skewed by temporary load fluctuations, such as flash crowds. Flash crowds are events when an application experiences an orders of magnitude increase in request rate from legitimate clients.

The expected service latency, and the redirection latency, for incoming requests may be calculated using exponential smoothing predictors. Even though exponential smoothing predictors operate satisfactorily for predicting latencies at a steady state, they often do not operate satisfactorily for predicting events such as hotspots or flash crowds. Linear-fit predictors may be used to detect flash crowds. The linear-fit predictors predict the expected latency for the near future (e.g., two minutes in the future). If predicted latency exceeds a certain threshold, then TTL values are set to zero. This enables the system to perform a more centralized queuing, and possibly load shedding, at higher levels and hence handle flash crowds effectively.

In another exemplary embodiment, if an application on a service host 137 is generating erroneous responses (which are often generated faster than legitimate responses), the routing system 55 is able to detect them as invalid responses. For example, the client hosts 135 may provide messaging to the global communicator 114 indicating that a particular service 118 is providing invalid responses, and the global communicator 114 may relay the information to other client hosts 135 to warn of the potentially failing service host 137.

It should be noted that although flowcharts may be provided herein to show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems, and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the invention have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components, including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method of routing service requests, comprising:
    receiving, by a first candidate host, a service request, wherein the first candidate host is operable to service the service request;
    discovering a plurality of candidate hosts operable to respond to the service request;
    obtaining latency data corresponding to one or more of the plurality of candidate hosts, wherein the latency data corresponds to at least one of a network latency, a redirection latency and a service latency;
    obtaining latency data associated with the first candidate host;
    determining whether the service request should be serviced by the first candidate host or routed to one or more of the plurality of candidate hosts, wherein the determination is based on a probabilistic distribution of the first candidate host and each of one or more of the plurality of candidate hosts corresponding to the latency data associated with the first candidate host and the latency data corresponding to one or more of the plurality of candidate hosts; and
    in response to the determination of whether the service request should be serviced by the first candidate host or routed to one or more of the plurality of candidate hosts, servicing the service request by the first candidate host.

2. The method as recited in claim 1, wherein discovering the plurality of candidate hosts includes accessing information about a hierarchy of hosts, the plurality of candidate hosts being logically defined as having locations within the hierarchy of hosts.

3. The method as recited in claim 1, wherein determining whether the service request should be serviced by the first candidate host or routed to one or more of the plurality of candidate hosts includes assigning weightings to the first candidate host and each of the one or more of the plurality of candidate hosts.

4. The method as recited in claim 3, wherein the assigned weightings correspond to measured latencies for the first candidate host and each of the plurality of candidate hosts.

5. The method as recited in claim 1, wherein determining whether the service request should be serviced by the first candidate host or routed to one or more of the plurality of candidate hosts includes:
    obtaining load information from the first candidate host and each of the one or more of the plurality of candidate hosts; and determining a latency based on the load information obtained from the first candidate host and each of the one or more of the plurality of candidate hosts.

6. The method as recited in claim 5 further comprising processing the load information based on at least one predictor.

7. The method as recited in claim 6, wherein the predictor is a linear fit predictor.

8. The method as recited in claim 6, wherein the predictor is an exponential smoothing predictor.

9. The method as recited in claim 1 further comprising determining whether the service request should be serviced by the first candidate host or routed to one or more of the plurality of candidate hosts according to a physical topology of the candidate hosts.

10. The method as recited in claim 1 further comprising determining whether the service request should be serviced by the first candidate host or routed to one or more of the plurality of candidate hosts according to heterogeneity information associated with the candidate hosts.

11. The method as recited in claim 1, wherein the plurality of candidate hosts are hierarchically organized into a hierarchy comprising (i) a first level including a plurality of leaf nodes, each of the leaf nodes corresponding to one of hosts, and (ii) a second level including a first plurality of zones which each comprise a subset of the plurality of leaf nodes.

12. The method as recited in claim 11, wherein the hierarchy further comprises (iii) a third level including a second plurality of zones which each comprise a subset of the first plurality of zones, and (iv) a fourth level including a root node which comprises the leaf nodes, the first plurality of zones, and the second plurality of zones.

13. The method as recited in claim 1, wherein the latency data associated with the first candidate host includes a service latency for servicing the request at the first candidate host.

14. The method as recited in claim 13, wherein the latency data associated with each of one or more of the plurality of candidate hosts includes at least one of a network latency and a service latency associated with servicing the request at the respective candidate host.

15. A non-transitory tangible computer-accessible medium bearing computer-executable instructions which, when executed on a computing device, direct the computing system to:

responsive to a service request at a first candidate host, discover a set of candidate host computers, the set of candidate host computers being a subset of the plurality of available computers;

determine whether the service request should be serviced by the first candidate host or routed to one or more candidate host computers of the set of candidate host computers, the determination based on a probabilistic distribution, the probabilistic distribution corresponding to latencies associated with the first candidate host and each of the one or more candidate host computers of the set of candidate host computers; and responsive to the determination of whether the service request should be serviced by the first candidate host or routed to one or more candidate host computers of the set of candidate host computers, service route the service request at the determined first candidate host or one or more candidate host computers of the set of candidate host computers.

16. The non-transitory computer accessible medium as recited in claim 15, wherein the plurality of available computers are organized in a hierarchy which comprises a first level including a plurality of leaf nodes, each of the leaf nodes corresponding to one of the plurality of host computers, and a second level including a first plurality of zones which each comprise a subset of the plurality of leaf nodes.

17. The non-transitory computer accessible medium as recited in claim 15, wherein the latencies associated with each of the one or more candidate computers of the set of candidate computers include a latency associated with a direct server response.

18. The non-transitory computer accessible medium as recited in claim 15, wherein the determination of whether the service request should be serviced by the first candidate host or routed to one or more candidate host computers of the set of candidate host computers is based on a comparison of vector latencies associated with the first candidate host and each candidate host computer of the set of candidate host computers.

19. The non-transitory computer accessible medium as recited in claim 15, wherein the latencies associated with the first candidate host include a service latency associated with servicing the request at the candidate host.

20. The non-transitory computer accessible medium as recited in claim 19, wherein the latencies associated with each of the one or more host candidate computers of the set of host candidate computers include at least one of a network latency and a service latency associated with servicing the request at the respective host candidate computer.

* * * * *